United States Patent
Cao et al.

(10) Patent No.: US 11,319,246 B2
(45) Date of Patent: May 3, 2022

(54) WATER-BLOCKING SYSTEMS INCLUDING FIBERS COATED WITH LIQUID RADIATION CURABLE SAP COMPOSITIONS

(71) Applicant: Covestro (Netherlands) B.V., Nieuwegein (NL)

(72) Inventors: Huimin Cao, Elgin, IL (US); Kangtai Ren, Elgin, IL (US); Mark Pepels, Echt (NL); Johan Franz Gradus Antonius Jansen, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 0 days.

(21) Appl. No.: 16/760,476

(22) PCT Filed: Nov. 5, 2018

(86) PCT No.: PCT/US2018/059205
§ 371 (c)(1),
(2) Date: Apr. 30, 2020

(87) PCT Pub. No.: WO2019/090218
PCT Pub. Date: May 9, 2019

(65) Prior Publication Data
US 2020/0255333 A1     Aug. 13, 2020

Related U.S. Application Data

(60) Provisional application No. 62/581,191, filed on Nov. 3, 2017.

(51) Int. Cl.
*C03C 25/285* (2018.01)
*C03C 25/1065* (2018.01)
*G02B 6/44* (2006.01)

(52) U.S. Cl.
CPC ........ *C03C 25/285* (2013.01); *C03C 25/1065* (2013.01); *G02B 6/4494* (2013.01)

(58) Field of Classification Search
CPC .. C03C 25/285; C03C 25/1065; G02B 6/4494
See application file for complete search history.

(56) References Cited

U.S. PATENT DOCUMENTS

| 4,324,744 A | 4/1982 | Lechtken |
| 4,474,830 A | 10/1984 | Taylor |

(Continued)

FOREIGN PATENT DOCUMENTS

| EP | 1170614 A1 | 1/2002 |
| EP | 1522545 B1 | 6/2011 |

(Continued)

OTHER PUBLICATIONS

State of Ohio, Department of Transportation, Supplemental Specification 904 Fiber Optic Cable and Components, Apr. 18, 2014 (Year: 2014).*

(Continued)

*Primary Examiner* — Peter Radkowski
(74) *Attorney, Agent, or Firm* — Jed C. Benson

(57) ABSTRACT

The present invention is directed to water-swellable, radiation curable compositions suitable for use in coating water-blocking fibers, such as optical fibers. The present invention is further directed to fibers, including optical fibers, which are coated with water-swellable exterior coatings that are configured to buckle and detach from the associated fiber to facilitate superior performance in longitudinal water-blocking testing. Also claimed and described are methods of applying such water-swellable coatings to optical fiber coatings. Further claimed and described are buffered bundles of fibers including at least one optical fiber that is coated with (Continued)

a water-swellable, radiation curable coating to ensure superior longitudinal water blocking performance.

20 Claims, 5 Drawing Sheets

(56) References Cited

U.S. PATENT DOCUMENTS

| | | | |
|---|---|---|---|
| 4,737,593 A | 4/1988 | Ellrich | |
| 4,851,165 A | 7/1989 | Rennell, Jr | |
| 5,157,752 A | 10/1992 | Greveling | |
| 5,213,893 A | 5/1993 | Kobayashi et al. | |
| 5,649,041 A * | 7/1997 | Clyburn, III | G02B 6/441 |
| | | | 385/109 |
| 5,684,904 A | 11/1997 | Bringuier | |
| 5,756,159 A * | 5/1998 | Hoskins | B01J 20/26 |
| | | | 427/394 |
| 5,817,713 A * | 10/1998 | Pappas | D06N 3/0056 |
| | | | 524/521 |
| 5,942,290 A | 8/1999 | Leppard | |
| 6,020,529 A | 2/2000 | Fremy | |
| 6,048,660 A | 4/2000 | Leppard | |
| 6,136,873 A * | 10/2000 | Hahnle | A61L 15/425 |
| | | | 521/61 |
| 6,403,674 B1 | 6/2002 | Schubert | |
| 6,455,600 B1 * | 9/2002 | Hahnle | A61L 15/425 |
| | | | 521/63 |
| 6,486,226 B2 | 11/2002 | Al-akhdar | |
| 6,486,228 B2 | 11/2002 | Koehler | |
| 6,565,981 B1 | 5/2003 | Messner et al. | |
| 6,750,262 B1 * | 6/2004 | Hahnle | A61L 15/24 |
| | | | 521/64 |
| 7,026,373 B2 | 4/2006 | Smith et al. | |
| 7,183,040 B2 | 2/2007 | Thies | |
| 7,899,291 B2 * | 3/2011 | Bardroff | G02B 6/4494 |
| | | | 385/100 |
| 8,815,770 B2 | 8/2014 | Elliott et al. | |
| 8,837,892 B2 | 9/2014 | Bennett | |
| 9,708,442 B1 | 7/2017 | Kwisnek | |
| 10,422,973 B2 | 9/2019 | Bookbinder et al. | |
| 2003/0124350 A1 | 7/2003 | Rebouillat et al. | |
| 2008/0181564 A1 | 7/2008 | Overton | |
| 2010/0080521 A1 * | 4/2010 | Bardroff | G02B 6/4494 |
| | | | 385/102 |
| 2010/0158457 A1 * | 6/2010 | Drozd | G02B 6/4432 |
| | | | 385/113 |
| 2014/0294355 A1 | 10/2014 | Bickham | |
| 2015/0071595 A1 | 3/2015 | Chen | |

FOREIGN PATENT DOCUMENTS

| | | |
|---|---|---|
| JP | H03137607 A | 6/1991 |
| WO | 1999026095 A1 | 5/1999 |
| WO | WO2011075549 A1 | 6/2011 |
| WO | 2013144027 A1 | 10/2013 |

OTHER PUBLICATIONS

International Search Report dated Mar. 14, 2019.
Written Opinion dated May 9, 2019.
ANSI/ICEA S-87-640-2006: Standard for Optical Fiber Outside Plant Communications Cable, Insulated Cable Engineers Association, Approved by American National Standards Institute, Dec. 8, 2006.

* cited by examiner

WATER-BLOCKING SYSTEMS INCLUDING FIBERS COATED WITH LIQUID RADIATION CURABLE SAP COMPOSITIONS

CROSS REFERENCE TO RELATED APPLICATIONS

This application claims priority to U.S. Provisional Patent Application No. 62/581,191, filed 3 Nov. 2017, the entire contents of which is hereby incorporated by reference in its entirety as if fully set forth herein.

TECHNICAL FIELD

The present invention relates to methods of coating water-blocking fibers, such as optical fibers, along with water-swellable compositions suitable for use therewith, the resulting water-blocking optical fibers, and buffer tubes incorporating such water-blocking optical fibers.

BACKGROUND

Optical fibers enable the guided transmission of light signals. They are preferable to alternative wire-based data-transmission media due to their ability to transmit data over longer distances without a significant loss in signal strength. Over the last several decades, an increased use of optical fibers has facilitated the global digital transformation. Thus, the telecommunication industry now utilizes optical fibers, especially those made from glass, as the preferred medium for data transmission.

The process of preparing long, thin glass strands for optical fiber production, called drawing, is well-known. Glass fibers are commonly drawn from a specially prepared, cylindrical preform which has been locally and uniformly heated to a temperature of, e.g., about 2000° C. As the preform is heated, such as by feeding the preform into and through a furnace, a glass fiber is drawn from the molten material. However, if left unprotected, bare glass optical fibers are unsuitable for field use because of the fragility of the thin glass strand across which optical signals are transmitted. In addition to their susceptibility to physical damage, uncoated optical fibers would also be negatively impacted by water contact. As a result, surface coatings have long-since been applied to optical fibers for protection and to ensure a high-level of performance. The surface coating compositions are typically applied to the glass fiber shortly after it has been drawn from the preform, preferably immediately after cooling. The coating compositions are then cured to produce the coated optical fiber.

To provide optimal protection, optical fibers are frequently coated with two or more superposed radiation-curable coatings immediately after the fiber is produced by drawing. The coating which directly contacts the optical fiber is called the "inner primary coating" and an overlaying coating is called the "outer primary coating." Over time, however, the inner primary coating has become more frequently referred to simply as the "primary coating," whereas the outer primary coating has become more frequently referred to simply as the "secondary coating." Primary coatings are typically formulated to possess a significantly lower modulus than secondary coatings.

The relatively soft primary coating provides resistance to microbending which results in added attenuation of the signal transmission (i.e. signal loss) of the coated optical fiber and is therefore undesirable. Microbends are microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protect the optical fiber from microbending, but as coating thickness decreases the amount of protection provided decreases. The harder outer Primary coating, that is, the Secondary coating, provides resistance to handling forces such as those encountered when the coated fiber is ribboned and/or cabled.

Primary coatings preferably possess a higher refractive index than the cladding of the associated optical fiber, in order to allow them to strip errant optical signals away from the core of the optical fiber. Primary coatings should maintain adequate adhesion to the glass fiber during thermal and hydrolytic aging, yet (if needed) be capable of being strippable therefrom for splicing purposes. The primary coating typically has a thickness in the range of 20-50 µm (e.g., about 25 or 32.5 µm), thinner thickness in the range of 15-25 µm for 200 µm fibers.

Secondary coatings contact and surround the primary coating. The secondary coating is, for example, the polymerization product of a coating composition whose molecules have become highly crosslinked when polymerized. In the embodiments described herein, the secondary coating has a high in-situ modulus (e.g., greater than about 800 MPa at 25° C., more preferably between about 1 GPa to about 3 GPa) and a high $T_g$ (e.g., greater than about 50° C.). The in-situ secondary modulus is preferably greater than about 1000 MPa. Secondary coatings often possess a thickness that is less than about 40 µm.

Fiber optic coatings, including the primary and secondary layers, are applied using one of two processes: wet-on-wet (WOW) and wet-on-dry (WOD). In the WOD process, the fiber passes first through a primary coating application, which is cured via exposure to electromagnetic (typically ultraviolet) radiation, then passes through a secondary coating application, which is subsequently cured by similar means. In the WOW process, the fiber passes through both the primary and secondary coating applications prior to entering the curing step. In a wet-on-wet process, the curing lamps between primary and secondary coating application are therefore omitted.

Radiant light energy is used in the manufacture of radiation curable coatings for optical fibers. In particular, curing processes use radiant energy from UV lamps to cure optical fiber coatings. UV lamps with broadband mercury spectra are commonly used in the industry, due to their high intensity and broad emission spectrum to ensure rapid and full cure of such radiation curable coatings. Increasingly, curing systems utilizing UV-LED (light emitting diodes) lamps have begun to be used as well, as their efficient construction enables a fiber production process with a reduced energy input.

After having been coated according to the processes described above, a plurality of distinct coated optical fibers are bundled or grouped together to form the functional portion of an optical fiber cable. This so-called bundling of optical fibers may take multiple general configurations. In one popular "matrix" configuration, a plurality of optical fibers are grouped together (often linearly) by virtue of a ribbon. Such optical fiber ribbons are comprised of a matrix material, which is typically UV-curable and may be formed from some of the same components which comprise the optical fiber primary and secondary coatings themselves. Then several ribbons are stacked together and arranged in a substantially square or rectangular cross section to form what is known as a matrix. The matrix is then inserted into a hollow, cylindrical protective sheath to form a so-called buffer tube. Because of the discrepancy in the cross-sectional shapes between the square (or rectangular) matrix and the circular buffer tube, a substantial unoccupied volume is created around the optical fiber matrix. This interstitial space is often filled with a gel material, which further absorbs various impacts and stresses that might be applied to the optical fibers during downstream handling. Such gel also acts as a barrier to prevent water ingress into the optical fiber.

In another popular "floating" configuration, a group of coated optical fibers are inserted without a ribbon individually into the buffer tube, in some cases around a central strength member. The buffer tubes in this instance may take the form of either a loose or tight configuration. In a loose buffer tube configuration, there remains a significant cavity between the coated optical fibers and the surrounding buffer tube. This void may be filled with a gel-type buffer tube filling material of the same variety used with matrix or ribbon configurations in order to serve substantially the same purpose.

In a tight buffer tube configuration, by contrast, almost the entire volume of the buffer tube is occupied by the coated optical fibers. In such a configuration the flexible buffer tubes utilized may possess a small diameter, such as 2.7 mm or less. As such, gels are rarely employed in this configuration. Such a configuration is highly desirable in cable applications wherein space is at a premium, as they afford the installation of a higher density of optical fibers (and hence a concomitantly greater quantum of data to be transmitted) per any given volume. This is particularly advantageous in fiber-to-home applications, in urban environments, or other applications wherein less real estate is afforded within which to complete the cable installation.

Regardless of the bundling configuration, a cable is ultimately manufactured by combining one or more buffer tubes with additional cable components, such as strength and protection members. In many instances, multiple buffer tubes are bound together with strength members to establish a cable core. The core may then be further protected by placing it within a core sheath. This sheath may comprise multiple layers, each of which may be formed from either organic or inorganic materials to guard against a variety of potential ingressions to add further strength, in a manner which is well-known in the art. Finally, a cable will be surrounded with a polymeric (such as polyethylene) upjacketing material to form an outer jacket to protect the cable from environmental exposure.

The numerous protection measures described above have been necessary to implement to ensure the long-term performance of optical fibers under harsh environmental conditions. Whether installed in a terrestrial cable system (including aerial cables), in a sea-floor system, in an underground cable-in-conduit system, or via direct underground burial, optical fibers are exposed to extreme temperature cycling, moisture, and water. Optical fiber cables must be able to withstand such harsh conditions for many years or decades. Despite the foregoing protection measures, however, the challenge of sufficiently preventing moisture or water ingression remains in the industry.

As noted above, water which comes into contact with the glass optical fiber tends to degrade the glass strength. Water ingression into the cable or buffer tube may also impair the digital light transmission through the fiber (i.e. a risk of attenuation increase), especially if the ingressed water subsequently freezes. Furthermore, the attenuation losses due to water ingression are exacerbated if the water ingresses across a long length of the fiber, so it is critical that the fiber design limits the extent of damage once a breach has occurred.

Accordingly, even in the event that water has ingressed into an optical fiber cable, it would be highly desirable to provide a solution which is longitudinally water-blocking, i.e., one which limits the subsequent length along which the breached water travels along the fiber or cable. This would minimize not only the aforementioned attenuation increase due to water ingression, but also the length of fiber that must be repaired and/or replaced during a water breach, in turn reducing the associated maintenance costs of the cables. Sufficiently longitudinally water-blocking designs would also limit the risk of water migrating along the cable to sensitive and expensive equipment at cable connection points.

Many attempts to improve the water-blocking characteristics of fibers and/or cables have been made over the years.

One approach, in, i.a., WO1999026095, prescribes the use of thixotropic gels or petroleum-based greases. Such gel-based approaches are known to sufficiently block the ingress of water into the cable by filling the free space inside a buffer tube and mechanically couple the optical fibers to the buffer tube. However, such materials are messy and cumbersome to work with in field operations (such as splicing), and therefore increase installation time and costs.

In order to eliminate the handling drawbacks associated with water-blocking gels during fiber splicing operations, other approaches promote the incorporation of water-blocking substrate-based elements, such as a yarn or tape impregnated or coated with powderized or liquid super absorbent polymers (SAP) into the buffer tube design. Particle-impregnated filaments or tapes of this type are described generally in U.S. Pat. No. 5,157,752. Also, EP1170614, for example, describes an "armor" tape-based substrate that is coated with liquid polymeric material at least partially cured thereon.

In US20030124350, dry SAP particles are impregnated within a yarn or polymeric fiber that is interwoven amongst a bundle of coated optical fibers or between the bundle and the buffer tube. US20080181564 describes further improvements thereon including the possibility of utilizing water-swellable polymeric fibers interwoven amongst the bundles in a similar fashion.

The aforementioned tapes, yarns, or fibers mitigate the cleaning problems associated with gels, but their longitudinal water blocking performance may remain inferior, in part due to the heterogeneity of the coated or impregnated substrate. Also, powder- or particle-based solutions may cause environmental concerns and can contribute to reduced microbending performance of the coated optical fiber with which they are associated. Furthermore, the relatively large required size and volume of the SAP-based or SAP-impregnated substrate (or even the particles themselves) used results in either a reduction in of the number of optical fibers which can be employed per given diameter buffer tube, or the utilization of larger-diameter buffer tubes. Either way, such solutions are ill-suited for applications requiring a high cable density (such as FTTX or metro applications).

Yet other approaches promote the use of bespoke liquid SAP coatings directly to an existing cable design element in order to maximize the available space by eliminating the need for a dedicated SAP-coated or impregnated substrate element. One such approach, described in U.S. Pat. No. 5,684,904, suggests lining the inner diameter of the buffer tube with a UV curable water-absorptive layer. A major drawback of this approach, however, is the difficulty of effectuating a UV curing process along the inner diameter of a lengthy expanse of buffer tube. The reference further suggests the possible utilization of transparent buffer tubes, which would both increase cable design cost and still not eliminate all difficulties associated with processing and curing.

Another approach, suggested in JPH03137607, is to incorporate water-absorptive components into the compositions of the coated optical fiber itself. This reference discusses the potential incorporation of SAP polymers into the "outermost" coating layer of the optical fiber, demonstrated in the figures as being connected to the primary layer as a secondary layer. This approach minimizes disruptions to the optical fiber coating process. However, imparting the entire thick secondary coating with SAP functionality would increase its cost, hinder its processability, and impair its function, leading to an expensive yet inferior coated optical fiber even in dry conditions. Furthermore, the reference's lack of specificity about optimized SAP chemistry and its preference for SAP inclusion in such thick coating layers (the coated fiber example SAP layer thickness is 50 microns) does not enable a coated optical fiber construction that would be optimally—or even sufficiently—longitudinally water-blocking.

From the foregoing, it is apparent that there exists an unmet need to provide a water-blocking solution which minimizes longitudinal water transport, does not introduce unnecessary complexity into the optical fiber production process or compromise the performance attributes of standard optical fibers, facilitates clean and easy maintenance, and enables construction of a high-density and/or reduced-size loose tube cable configuration.

BRIEF SUMMARY

Described herein are several embodiments of the invention which solve this unmet need. A first embodiment is a water-swellable, radiation curable coating composition for an optical fiber including an acrylic acid, a salt of an acrylic acid, a monofunctional ethylenically unsaturated network former, a photoinitiator, a viscosity modifier, an amount of water, and a multifunctional crosslinker, wherein the water-swellable, radiation curable coating composition is a liquid at room temperature.

A second embodiment is an optical fiber coated with a primary coating, a secondary coating adhered to and surrounding the primary coating, and a water-swellable exterior coating adhered to and surrounding the secondary coating, wherein the water-swellable exterior coating is configured to buckle and detach from the secondary coating at least one point along a section of the coated optical fiber within 3 minutes after the coated optical fiber has been submerged in deionized water.

A third embodiment is a method of applying a liquid, water-swellable coating to a coated optical fiber comprising the steps of providing a coated optical fiber, applying a liquid water-swellable coating composition to an exterior surface of a section of coated optical fiber to form a coated optical fiber with a liquid water-swellable exterior coating composition, and exposing the coated optical fiber with the liquid water-swellable exterior coating composition to a light source capable of emitting ultraviolet radiation to affect curing of said liquid water-swellable exterior coating composition, to form a coated optical fiber with a water-swellable exterior coating, wherein the water-swellable exterior coating is configured to buckle and detach from the coated optical fiber at least one point along the section of the coated optical fiber within 3 minutes after the time from which the coated optical fiber with the water-swellable exterior coating has been submerged in deionized water.

A fourth embodiment is a buffered bundle of optical fibers, comprising a flexible buffer tube possessing a length and a cavity over at least a portion of the length, and a plurality of coated optical fibers disposed within the cavity of the flexible buffer tube along the portion, wherein at least one of the plurality of coated optical fibers comprises a water-swellable exterior coating, further wherein said water-swellable exterior coating is configured to buckle and detach from the coated optical fiber at least one point along a section thereof within 3 minutes from a time at which the cavity becomes filled with deionized water.

Further embodiments of the invention are described below.

DETAILED DESCRIPTION

Figure 1:
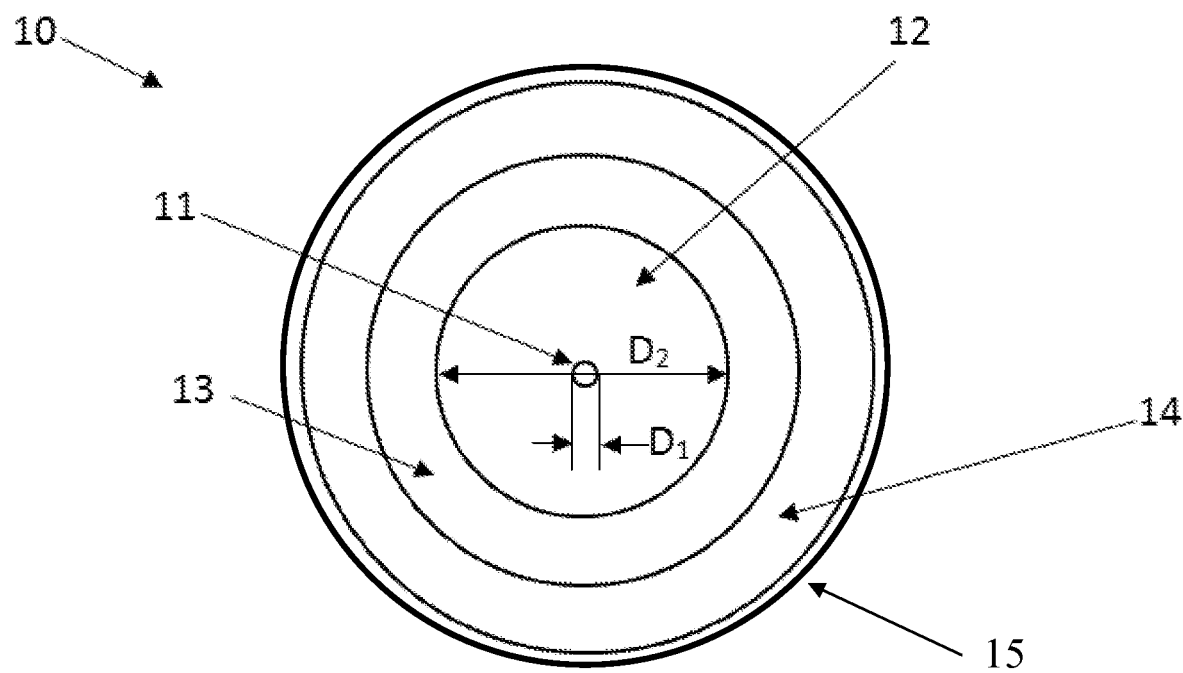
FIG. 1 is a cross-sectional view of a coated optical fiber according to an embodiment of the present invention.

A first embodiment is a water-swellable, radiation curable coating composition for a fiber including an acrylic acid, a salt of an acrylic acid, a monofunctional ethylenically unsaturated network former, a photoinitiator, a viscosity modifier, an amount of water, and a multifunctional crosslinker, wherein the water-swellable, radiation curable coating composition is a liquid at room temperature. Such compositions are suitable for elongated thin fibers, such as those made from plastic or glass. In an embodiment, such compositions are suitable for coating fibers comprised of ultra-high molecular weight polyethylene polymers, such as Dyneema®. In a preferred embodiment, however, the compositions described herein are particularly suitable for use in coating optical fibers.

Inventors have constructed compositions according to the present invention, which in addition to being water-swellable, are uniquely tailored to be optimally performing in the optical fiber application and to meet the requirements of the optical fiber coating process. Among these processing requirements for the composition include UV curability, being liquid at room temperature, and possessing a substantial degree of homogeneity. Compositions according to the present invention may be considered superabsorbent polymers (SAP). SAPs are swellable thermoset networks that absorb and retain extremely large quantities of a liquid relative to their own mass.

UV-curable SAP compositions are known, and are described in, i.a., EP1522545. Such SAPs are generally based on crosslinked polymeric chains formed from, (meth) acrylamide or (meth)acrylic acid monomers. The polymer chains formed contain a large number of carboxyl groups. Hydrogen atoms are released through contact with water, resulting in the formation of carboxylate groups. It is believed, without wishing to be bound by any theory, that these carboxylate groups are mutually repellent and create a scaffolding in the polymer network whereby passing water molecules may be encased and trapped.

It is known that the absorption capacity of super-absorbent polymers increases further when the acrylic acid is neutralized with a strong base. The resultant neutralized carboxylate groups facilitate significant osmotic water absorption. The positively charged ions become hydrated, in turn increasing the physical gap between successive carboxylate groups. The remaining free carboxylate groups will once again repel each other, whereby the chains will begin to stretch more such that even more space is created for the absorption of extra water.

One feature of the compositions according to certain embodiments of the present invention is that they are liquid at room temperature. This preserves the possibility that such compositions are processable in optical fiber coating applications, and further ensures that the SAP constituents within the formulation are generally dispersed homogeneously or dissolved throughout the liquid resin. A liquid SAP material is advantageous in optical fiber applications over powderized or particle-based SAP systems, because liquid systems obviate the health and safety concerns associated with working with powders, and they further mitigate the occurrence of SAP particle-induced microbends which would produce an undesirable signal loss (aka microbend-induced attenuation) in the corresponding optical fiber. Furthermore, because many common SAP powders possess a particle size that is as large or larger than the optimal coating thickness, it is preferable to use liquid-based systems where particle size is not a constraint the system design.

Accordingly, although the water-swellable coatings, coated optical fibers, methods of coating an optical fiber, or buffer tubes described elsewhere herein which solve the problems of the present invention are not necessarily limited to any specific SAP composition or set of SAP compositions, in a preferred embodiment, the liquid composition includes an acrylic acid, an acrylic acid salt, a monofunctional ethylenically unsaturated network former, a photoinitiator, a viscosity modifier, an amount of water, a multifunctional crosslinker, and further optionally one or more additives. Each component is discussed herein in turn.

Acrylic Acid

In an embodiment, therefore, the composition includes an acrylic acid. Acrylic acid is an organic compound with the formula $CH_2=CHCOOH$. It is the simplest unsaturated carboxylic acid, consisting of a vinyl group connected directly to a carboxylic acid terminus. Higher molecular weight polyacrylic acids may also be considered acrylic acids.

The presence of the acrylic acid in the final composition is optional. However, Inventors have discovered that the presence of a residual amount of un-neutralized acrylic acid in the final formulation may contribute to ensuring the homogeneity of the composition, in that it helps to minimize the precipitation of the acrylic acid salt after formulation. In an embodiment, therefore, the acrylic acid is present in an amount, relative to the weight of the entire water-swellable, radiation curable coating composition for an optical fiber, from 0 wt. % to 60 wt. %, or from 10 wt. % to 60 wt. %, or 15 wt. % to 40 wt. %, or 18 wt. % to 35 wt. %, or 20 wt. % to 30 wt. %.

The relative quantity of the acrylic acid in the formulation may alternatively be described in terms of molality. The concept of molality, which is a representation of the number of moles of a particular substance per given unit mass, is well known. The SI unit for molality is moles per kilogram. It may be determined by dividing the mass of the particular component to be measured per 1 kilogram of the entire composition by the molar mass of that component. The molar mass, meanwhile, is determined by multiplying the standard atomic weight (of the idealized compound to be measured) by the constant $1\times10^{-3}$ kg/mol.

In an embodiment, therefore, the acrylic acid is present, in an amount relative to the entire water-swellable, radiation curable coating composition for an optical fiber expressed in terms of molality, from 0 to 4.2 mol/kg, or from 0.14 to 4.2 mol/kg, or from 0.7 to 2.1 mol/kg.

The relative quantity of the acrylic acid in the formulation may alternatively be described in terms of acryloyl equivalents. The method for determining equivalents (such as acryloyl equivalents) is similar to molality and is also well-known, expressed in, i.a., U.S. Pat. No. 7,183,040. As used herein, the number of acryloyl equivalents of a particular component in the composition is calculated in accordance with the formula:

$$\text{Equivalents of a component } Z = \frac{\text{Wt \%}}{N \times Mwt}$$

Wherein "Wt %" is the weight in kilograms of the component to be measured relative to that of 1 kg of the entire composition, "N" is the number of acryloyl groups in an idealized molecule of component Z, and "Mwt" is the molecular weight of an idealized molecule of the particular compound to be measured. Wherein "Wt %" is the weight in kilograms of the component to be measured relative to that of 1 kg of the entire composition, "N" is the number of acryloyl groups in an idealized molecule of component Z, and "Mwt" is the molecular weight of an idealized molecule of the particular compound to be measured.

Because acrylic acid possesses only a single acryloyl group in its molecule, the acryloyl equivalents will not differ from the molality expressed above. Thus, in an embodiment, the total composition possesses from about 0.14 to about 4.2 acryloyl equivalents, or from 0.7 to 2.1 acryloyl equivalents by virtue of the inclusion of the acrylic acid component. Stated alternatively, the acrylic acid component contributes from 0.14 to about 4.2, or from 0.7 to 2.1 acryloyl equivalents into the total composition.

In another embodiment, even if the water-swellable radiation curable coating composition for an optical fiber does not possess a detectable amount of acrylic acid itself, an acrylic acid would have been used as a reactant to form a salt derivative of an acrylic acid, which will be present. Hence, in varying embodiments, the acrylic acid may be present in varying degrees of neutralization. As used herein, the degree of neutralization refers to the relative quantity by weight, expressed as a percent, of the starting acrylic acid that is converted to an acrylic acid salt (i.e. neutralized) by a suitable base. It may be determined in the final formulation by dividing the total amount, by weight, of the acrylic acid salt by the total amount, by weight, of the acrylic acid salt plus the (un-neutralized) acrylic acid.

Acrylic Acid Salt

In an embodiment, therefore, composition of the present invention also includes an acrylic acid salt, which is the reaction product of the acrylic acid and a base. The base selected can be any suitable alkaline component, including basic salts. A basic salt itself is the reaction product of the neutralization of a strong base with a weak acid, which indicates that basic salts themselves are also bases. A basic salt includes salts containing an ionizable hydroxyl group.

An example of a basic salt is an alkali salt. An alkali salt is a water-soluble hydroxide of alkali metals and/or alkaline earth metals. Common examples of alkali salts include sodium hydroxide, potassium hydroxide, lye, calcium hydroxide, and magnesium hydroxide, although others exist as will be understood by the person having ordinary skill in the art. In an embodiment, the alkali salt comprises a lithium, sodium, or potassium cation.

In an embodiment, the acrylic acid salt is the reaction product of an acrylic acid and an ionic compound consisting of an alkali metal cation and a hydroxide anion. The alkali metal may be selected from any of the appropriate group I elements, including lithium, sodium, potassium, rubidium, cesium, or francium. In a preferred embodiment, the ionic compound possesses a sodium cation, which, upon reaction with acrylic acid, results in the formation of a salt in the form of sodium acrylate.

The acrylic acid salt is useful in enabling the successful formulation of a water-swellable radiation curable coating composition for an optical fiber in several respects. First, it contributes to the improved water swellability of the coating into which it is incorporated. It also enables the formulation of a cured coating with greater integrity, as indicated by its tendency to effectuate an increase in the equilibrium modulus value of its associated coating.

Inventors have discovered that the degree of neutralization of the acrylic acid is linked to an improvement in the speed at which the coating composition into which it is incorporated is processable in optical fiber coating applications. In other words, Inventors have surprisingly found that the coating composition's ability to cure quickly during optical fiber drawing or inking processing is improved as the percentage of the initial acrylic acid which is converted to a salt increases. This is beneficial in optical fiber coating applications, wherein it is highly desirable to effectuate curing at high speeds and/or with reduced energy input. It is believed, without wishing to be bound by any theory, that the degree of neutralization is tied to a reduction of oxygen-inhibition, a phenomenon which is known to have a chilling effect on free-radical polymerization kinetics.

Additionally, although the degree of neutralization does not appear to have a significant effect on initial swelling performance, Inventors believe that if the degree of neutralization becomes too low, the optical fiber coatings formed therefrom tend to exhibit a degradation of swelling performance over time. Without wishing to be bound by any theory, this may be the result of a large amount of un-neutralized acrylic acid's contribution to the secondary formation of additional network crosslinks over time.

In an embodiment, therefore, at least a portion of the initial acrylic acid is neutralized by the basic salt. In an embodiment, the reaction of the acrylic acid and the basic salt neutralizes at least 10% of the acrylic acid, more preferably at least 25% of the acrylic acid, or at least 33% of the acrylic acid, or at least 50% of the acrylic acid, or at least 75% of the acrylic acid, or at least 90% of the acrylic acid. In an alternative embodiment, an alkali salt neutralizes between 10-100% of the acrylic acid by weight, relative to the amount of acrylic acid present before the reaction, or between 25-90% by weight, or between 33-95% by weight, or between 50-98% by weight, or between 75-100% by weight. In an alternative embodiment, the acrylic acid possesses a degree of neutralization of between 10-100%, or between 25-99%, or between 33-98%, or between 50-95%, or between 75-90%. In yet other embodiments, the degree of neutralization is at least 10%, or at least 20%, or at least 30%, or at least 40%, or at least 50%, or at least 60%, or at least 70%, or at least 80%, or at least 90%, or at least 95%, or at least 98%. In an embodiment, the degree of neutralization is approximately 100%.

The ratio of the un-neutralized acrylic acid to the amount of acrylic acid which has been neutralized by the basic salt that is present in the liquid swellable radiation curable coating for an optical fiber may also play an important role in determining that composition's cure speed during the coating and curing process, as well as its potential swell behavior once cured on an optical fiber. In an embodiment, therefore, the water-swellable radiation curable coating composition for an optical fiber comprises a ratio of the acrylic acid to the acrylic acid salt from about 12:1 to about 1:12, or from about 6:1 to about 1:6, or from about 3:1 to about 1:1. The aforementioned ratios may be either expressed as molar ratios or in terms of ratios by weight.

The water-swellable radiation curable coating composition for an optical fiber may comprise any suitable amount of an acrylic acid salt, such as, relative to the weight of the entire water-swellable, radiation curable coating composition for an optical fiber an amount of about 1 wt. % to about 30 wt. %, or from about 5 wt. % to about 15 wt. %.

In an embodiment, the total amount of the acrylic acid-derived components (i.e. the acrylic acid and the acrylic acid salt) is present in an amount, relative to the entire composition, from about 1.4 to about 8.3 mol/kg, or from 2.1 to 5.6 mol/kg, or from 2.5 to 4.9 mol/kg, or from, 2.8 to 4.2 mol/kg.

Monofunctional Ethylenically Unsaturated Network Former

The water-swellable radiation curable coating composition for an optical fiber may include at least one compound that is ethylenically unsaturated and contributes to ensuring the homogeneous dispersion of the SAP components. In a preferred embodiment, the ethylenically unsaturated component comprises an acrylate ester or an acrylamide. The acrylate esters or acrylamides may be of any suitable molecular weight but are preferably monomeric. In a preferred embodiment, the ethylenically unsaturated component is monofunctional. As used herein, "monofunctional" means the pertinent component possesses an average of from 0.9 to 1.1 functional groups per molecule. In an embodiment, the functional groups are acryloyl groups.

Some of the most common acrylic acid esters are methyl-, ethyl-, n-butyl- and 2-ethylhexyl (2 EHA)-esters. Some specific examples include 2-ethylhexyl acrylate, diethylene glycol diacrylate, methyl acrylate, ethyl acrylate, polyacrylic acid, n-butyl acrylate, hydroxypropyl acrylate, and dimethyl aminoethyl acrylate.

Other typical examples of lower molecular weight monomers containing one double bond are alkyl or hydroxyalkyl acrylates, for example 2-hydroxyethyl acrylate, isobornyl acrylate, and methyl and ethyl acrylate. Further examples of these monomers are acrylonitrile, acrylamide, N-substituted acrylamides such as n-(2-hydroxypropryl)acrylamide, N-isopropylacrylamide, vinyl esters such as vinyl acetate, styrene, alkylstyrenes, halostyrenes, N-vinylpyrrolidone (such as although other ethylenically unsaturated monomers such as n-vinyl pyrrolidone (such as 1-vinyl-2-pyrrolidone), N-vinyl caprolactam, vinyl chloride and vinylidene chloride.

In an embodiment, the water-swellable radiation curable coating composition for an optical fiber includes an ethylenically unsaturated swelling compound that is a hydroxy functional acrylate compound. Examples of hydroxy functional acrylate compounds include 2-hydroxypropyl acrylate, 3-hydroxy propyl acrylate, hydroxy ethyl acrylate, 4 hydroxy butyl acrylate, 2,3-dihydroxy propyl acrylate, 2-hydroxy-1-(hydroxymethyl)ethyl acrylate, or 2-acrylamido-2-methyl-1-propanesulfonic acid.

In an embodiment, the ethylenically unsaturated compound is an ethoxylated acrylate ether. Examples of ethoxylated acrylate ethers include methoxy (poly ethylene glycol) acrylate, ethoxy (polyethylene glycol) acrylate, 2-(2-ethoxyethoxy)ethyl acrylate, ethylene glycol methyl ether acrylate, diethylene glycol methyl ether acrylate, triethylene glycol methyl ether acrylate, tetratethylene glycol methyl ether acrylate, ethylene glycol ethyl ether acrylate, diethylene glycol ethyl ether acrylate, triethylene glycol ethyl ether acrylate, tetratethylene glycol ethyl ether acrylate, diethylene glycol -2-ethylhexylether acrylate.

One or more of the aforementioned reactive ethylenically unsaturated network formers can be employed in compositions according to the present invention in any suitable amount, and may be chosen singly or in combination of one or more of the types enumerated herein. The water-swellable radiation curable coating composition for an optical fiber may contain the ethylenically unsaturated network former in an amount by weight, relative to the weight of the entire water-swellable, radiation curable coating composition for an optical fiber of about 5 wt. % to about 50 wt. %, more preferably from about 10 wt. % to about 30 wt. %.

Expressed alternatively in terms of molality, in another embodiment, the monofunctional ethylenically unsaturated network former may be present in an amount, relative to the entire composition, from about 0.38 to about 3.8 mol/kg, or from about 0.75 to about 2.3 mol/kg. Additionally, in an embodiment the entire composition will possess from 0.38 to about 3.8 acryloyl equivalents by virtue of the monofunctional ethylenically unsaturated network former, or from about 0.75 to about 2.3 acryloyl equivalents by virtue of the monofunctional ethylenically unsaturated network former. Stated alternatively, the total amount of monofunctional ethylenically unsaturated network formers present in the composition will contribute from about 0.38 to about 3.8, or from about 0.75 to 2.3 acryloyl equivalents.

Photoinitiator

The compositions of the present invention include a photoinitiator. In preferred embodiments, the composition includes at least one free-radical photoinitiator. In its broadest sense, the photoinitiator is a compound that chemically changes due to the action of light or the synergy between the action of light and the electronic excitation of a sensitizing dye to produce at least one of a radical, an acid, and a base.

According to an embodiment of the present invention, the free-radical photoinitiator is an acylphosphine oxide photoinitiator. Acylphosphine oxide photoinitiators are disclosed for example in U.S. Pat. Nos. 4,324,744, 4,737,593, 5,942,290, 5,534,559, 6,020,529, 6,486,228, and 6,486,226.

The acylphosphine oxide photoinitiators are bisacylphosphine oxides (BAPO) or monoacylphosphine oxides (MAPO).

The bisacylphosphine oxide photoinitiators are of the formula I:

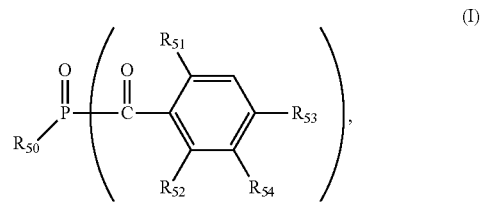

wherein $R_{50}$ is $C_1$-$C_{12}$ alkyl, cyclohexyl or phenyl which is unsubstituted or is substituted by 1 to 4 halogen or $C_1$-$C_8$ alkyl;

$R_{51}$ and $R_{52}$ are each independently of the other $C_1$-$C_8$ alkyl or $C_1$-$C_8$alkoxy;

$R_{53}$ is hydrogen or $C_1$-$C_8$ alkyl; and $R_{54}$ is hydrogen or methyl.

For example, $R_{50}$ is $C_2$-$C_{10}$ alkyl, cyclohexyl or phenyl which is unsubstituted or is substituted by 1 to 4 $C_1$-$C_4$ alkyl, Cl or Br. Another embodiment is where $R_{50}$ is $C_3$-$C_8$ alkyl, cyclohexyl or phenyl which is unsubstituted or is substituted in the 2-, 3-, 4- or 2,5-positions by $C_1$-$C_4$ alkyl. For instance, $R_{50}$ is $C_4$-$C_{12}$ alkyl or cyclohexyl, $R_{51}$ and $R_{52}$ are each independently of the other $C_1$-$C_8$ alkyl or $C_1$-$C_8$alkoxy and $R_{53}$ is hydrogen or $C_1$-$C_8$ alkyl. For instance, $R_{51}$ and $R_{52}$ are $C_1$-$C_4$ alkyl or $C_1$-$C_4$alkoxy and $R_{53}$ is hydrogen or $C_1$-$C_4$ alkyl. Another embodiment is where $R_{51}$ and $R_{52}$ are methyl or methoxy and $R_{53}$ is hydrogen or methyl. For example $R_{51}$, $R_{52}$ and $R_{53}$ are methyl. Another embodiment is where $R_{51}$, $R_{52}$ and $R_{53}$ are methyl and $R_{54}$ is hydrogen. Another embodiment is where $R_{50}$ is $C_3$-$C_8$ alkyl. For example, $R_{51}$ and $R_{52}$ are methoxy, $R_{53}$ and $R_{54}$ are hydrogen and $R_{50}$ is isooctyl. For instance $R_{50}$ is isobutyl. For example $R_{50}$ is phenyl. The present bisacylphosphine oxide photoinitiator is for example bis(2,4,6-trimethylbenzoyl)-phenylphosphine oxide (CAS #162881-26-7) or is bis(2,4,6-trimethylbenzoyl)-(2,4-bis-pentyloxyphenyl)phosphine oxide.

The monoacylphosphine oxide photoinitiators are of the formula II:

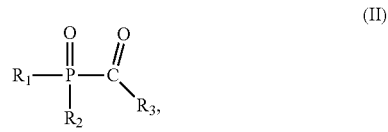

in which $R_1$ and $R_2$ independently of one another are $C_1$-$C_{12}$alkyl, benzyl, phenyl which is unsubstituted or substituted from one to four times by halogen, $C_1$-$C_8$ alkyl and/or $C_1$-$C_8$ alkoxy, or are cyclohexyl or a group —$COR_3$, or $R_1$ is —$OR_4$;

$R_3$ is phenyl which is unsubstituted or substituted from one to four times by $C_1$-$C_8$ alkyl, alkoxy, $C_1$-$C_8$ alkylthio and/or halogen; and $R_4$ is $C_1$-$C_8$ alkyl, phenyl or benzyl. For example, $R_1$ is —$OR_4$. For example $R_2$ is phenyl which is unsubstituted or substituted from one to four times by halogen, $C_1$-$C_8$ alkyl and/or $C_1$-$C_8$ alkoxy. For example $R_3$ is phenyl which is unsubstituted or substituted from one to four times by $C_1$-$C_8$alkyl. For example, the present monoacylphosphine oxide is 2,4,6-trimethylbenzoylethoxyphenylphosphine oxide (CAS #84434-11-7) or 2,4,6-trimethylbenzoyldiphenylphosphine oxide (CAS #127090-72-6).

Compositions according to the present invention may also employ further photoinitiators, for example α-hydroxy ketone photoinitiators of the formula III:

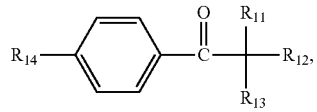
(III)

where $R_{11}$ and $R_{12}$ independently of one another are hydrogen, $C_1$-$C_6$ alkyl, phenyl, $C_1$-$C_6$ alkoxy, $OSiR_{16}(R_{17})_2$ or —$O(CH_2CH_2O)_q$—$C_1$-$C_6$ alkyl, or $R_{11}$ and $R_{12}$, together with the carbon atom to which they are attached, form a cyclohexyl ring;

q is a number from 1 to 20;

$R_{13}$ is OH, $C_1$-$C_{16}$ alkoxy or —$O(CH_2CH_2O)_q$—$C_1$-$C_6$ alkyl;

$R_{14}$ is hydrogen, $C_1$-$C_{18}$ alkyl, $C_1$-$C_{12}$hydroxyalkyl, $C_1$-$C_{18}$ alkoxy, —$OCH_2CH_2OR_{15}$, —$CH=CH_2$, —$C(CH_3)=CH_2$ or is

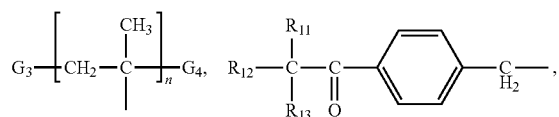

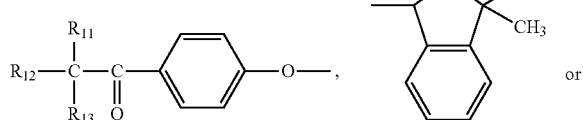

n is a number from 2 to 10;

$R_{15}$ is hydrogen, —$COCH=CH_2$ or —$COC(CH_3)=CH_2$;

$R_{16}$ and $R_{17}$ independently of one another are $C_1$-$C_8$ alkyl or phenyl; and $G_3$ and $G_4$ independently of one another are end groups of the polymeric structure, preferably hydrogen or methyl.

α-hydroxy ketone photoinitiators that are of interest are those in which $R_{11}$ and $R_{12}$ independently of one another are hydrogen, $C_1$-$C_6$ alkyl or phenyl or $R_{11}$ and $R_{12}$, together with the carbon atom to which they are attached, form a cyclohexyl ring, $R_{13}$ is OH, and $R_{14}$ is hydrogen, $C_1$-$C_{12}$ alkyl, $C_1$-$C_{12}$ alkoxy, —$OCH_2CH_2OR_{15}$, —$C(CH_3)=CH_2$ or is

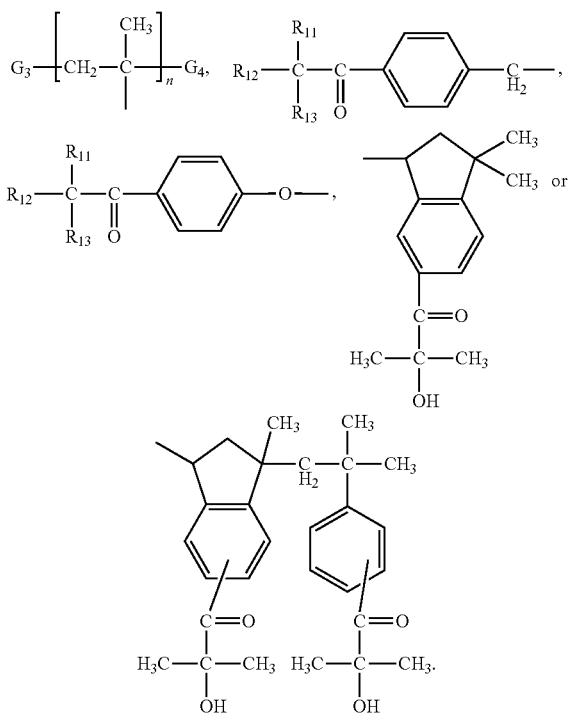

For example, suitable as the α-hydroxy ketone photoinitiators are those in which $R_{11}$ and $R_{12}$ independently of one another are methyl or ethyl or $R_{11}$ and $R_{12}$, together with the carbon atom to which they are attached, form a cyclohexyl ring, $R_{13}$ is hydrogen and $R_{14}$ is hydrogen, $C_1$-$C_4$ alkyl, $C_1$-$C_4$ alkoxy or —$OCH_2CH_2OH$. Interesting also are compounds, wherein $R_{14}$ is

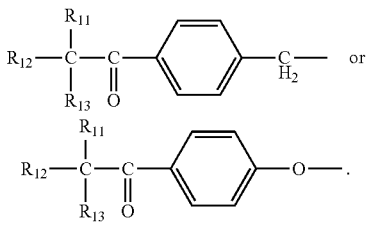

For instance, suitable α-hydroxy ketone photoinitiators are

α-hydroxycyclohexyl phenyl ketone,
2-hydroxy-2-methyl-1-phenylpropanone,
2-hydroxy-2-methyl-1-(4-isopropylphenyl)propanone,
2-hydroxy-2-methyl-1-(4-dodecylphenyl)propanone,
2-Hydroxy-1-{4-[4-(2-hydroxy-2-methyl-propionyl)-benzyl]-phenyl}-2-methyl-propan-1-one and
2-hydroxy-2-methyl-1-[(2-hydroxyethoxy)phenyl]propanone.

The present α-hydroxy ketone photoinitiator is for example α-hydroxycyclohexylphenyl ketone or 2-hydroxy-2-methyl-1-phenyl-1-propanone. Straight or branched chain alkyl is for example, methyl, ethyl, propyl, isopropyl, butyl, isobutyl, sec-butyl, tert-butyl, pentyl, isopentyl, isooctyl,

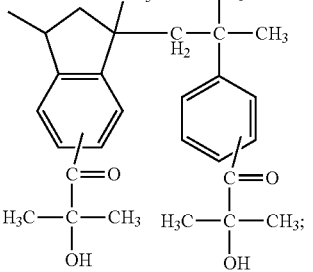

hexyl, heptyl, octyl, nonyl, decyl or dodecyl. Likewise alkoxy or alkylthio are of the same straight or branched chains.

Photoinitiators according to the present invention may be employed singularly or in combination of one or more as a blend. Suitable photoinitiator blends (PI blends) are for example disclosed in U.S. Pat. No. 6,020,528 and U.S. Pat. app. No. 60/498,848. The present PI (photoinitiator) blends are for example a mixture of bis(2,4,6-trimethylbenzoyl) phenylphosphine oxide (CAS #162881-26-7) and 2,4,6,-trimethylbenzoylethoxyphenylphosphine oxide (CAS #84434-11-7) in ratios by weight of about 1:11, 1:10, 1:9, 1:8 or 1:7.

Another especially suitable PI blend is a mixture of bis(2,4,6-trimethylbenzoyl)phenylphosphine oxide, 2,4,6,-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable PI blend is a mixture of bis(2,4,6-trimethylbenzoyl)phenylphosphine oxide and 2-hydroxy-2-methyl-1-phenyl-1-propanone in weight ratios of for instance about 1:3, 1:4 or 1:5. The present acylphosphine oxide PI or PI blend is present in the radiation-curable compositions from about 0.2 to about 10% by weight, based on the weight of the composition. For instance, the PI or PI blend is present from about 0.5 to about 8%, about 1 to about 7%, or about 2, 3, 4, 5 or 6% by weight based on the weight of the radiation-curable composition.

Other suitable photoinitiators according to this invention are for or example, other mono- or bisacylphosphinoxides such as diphenyl-2,4,6-trimethylbenzoylphosphine oxide or bis(2,6-dimethoxybenzoyl)-2,4,4-trimethylpentylphosphineoxide; α-hydroxyketones, such as 1-hydroxycyclohexylphenylketone or 2-hydroxy-1-[4-(2-hydroxyethoxy)phenyl]-2-methyl-1-propanone; α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Other suitable photoinitiators employed according to this invention, with or without acylphosphine oxide photoinitiators, are for example oxime esters as disclosed in U.S. Pat. No. 6,596,445. A suitable oxime ester photoinitiator is for example:

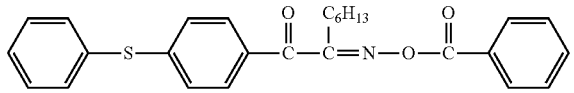

In addition to oxime ester photoinitiators, certain so-called cationic photoinitiators, such as those of the sulfonium or iodonium salt type, also generate free radicals and could be used as photoinitiators in embodiments of the present invention. Such photoinitiators are described in, i.a., U.S. Pat. No. 9,708,442.

Another class of suitable photoinitiators according to this invention, with or without acylphosphine oxide photoinitiators, are for example phenyl glyoxalates, for example as disclosed in U.S. Pat. No. 6,048,660. For example phenyl glyoxalates of the formula:

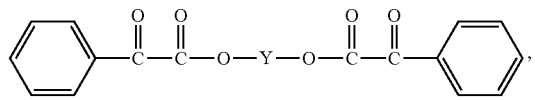

wherein Y is $C_1$-$C_{12}$alkylene, cyclohexylene, $C_2$-$C_{40}$alkylene interrupted one or more times by cyclohexylene, O, S, or $NR_{30}$, and $R_{30}$ is hydrogen, $C_1$-$C_{12}$alkyl or phenyl, preferably Y is $CH_2CH_2$—O—$CH_2CH_2$.

One or more of the aforementioned photoinitiators can be employed in compositions according to the present invention in any suitable amount, and may be chosen singly or in combination of one or more of the types enumerated herein. In a preferred embodiment, the photoinitiator component is present in an amount, relative to the entire weight of the liquid, water-swellable composition for coating an optical fiber, from about 0.1 wt. % to about 10 wt. %, or from about 0.1 wt. % to about 5 wt. %, or from about 1 wt. % to about 5 wt. %.

Viscosity Modifier

Inventors have discovered the aforementioned SAP components (mentioned elsewhere herein) which contribute to the formation of a sufficiently water-swelling liquid radiation curable coating often tend to do so at the expense of the composition's processability in optical fiber coating processes. Therefore, one or more additional components may be included to ensure the coating possesses a viscosity suitable for the optical fiber coating application. These so-called viscosity-modifiers are not necessarily added with the intention to improve the swellability of the composition into which they are incorporated, although it is desirable that they do not significantly hinder this important coating property.

Although not necessarily limited thereto, the viscosity modifiers described herein typically would be included to increase the viscosity of the composition into which they are incorporated, because the aforementioned SAP-related constituents often yield compositions with a viscosity that is too low to be suitable in optical fiber processing applications. Many of the compositions including the acrylic acid salts, ethylenically unsaturated network formers (especially such as lower molecular weight monofunctional acrylate monomers, for example) as described herein possess an unsuitably low viscosity. If the viscosity of the composition is too low, a coating of sufficient thickness will not adhere to the previously coated layer, or may experience running and/or dripping such that the thickness is not applied uniformly.

On the other hand, it may in some instances be necessary to include viscosity modifiers that reduce the overall viscosity of the composition into which they are associated. If the viscosity of the composition is too high, the coating may not sufficiently flow through the coating die to enable optimum coverage onto the previously coated layer, either.

In an embodiment, the viscosity modifier is water soluble. In an embodiment, the water-soluble viscosity modifier comprises a polyvinyl alcohol, a polyvinyl pyrrolidone, a starch, a modified cellulose, a gelatin, a polyglycol compound such as polyethylene glycol with a molecular weight from 250,000 to 4,000,000 g/mol, or a polyacrylic acid.

Polyvinyl alcohols are water-soluble synthetic polymers which possess the idealized formula $[CH_2CH(OH)]n$. They may be known analogously and/or commercially as PVOH; Poly(Ethenol), Ethenol, homopolymer, PVA, Polyviol, Vinol, Alvyl, Alcotex, Covol, Gelvatol, Lemol, Mowiol, Mowiflex, Alcotex, Elvanol, Gelvatol, Lemol, Mowiol, Nelfilcon A, Polyviol and Rhodoviol.

Polyvinyl pyrrolidone is a water-soluble polymer made from the monomer N-vinylpyrrolidone. It may be known analogously and/or commercially as PVP, Povidone, Copovidone, PVPP, Crospovidone, Polyvidone, PNVP, Poly[1-(2-oxo-1-pyrrolidinyl)ethylen], 1-Ethenyl-2-pyrrolidon homopolymer, or 1-vinyl-2-pyrrolidinon-polymere.

A starch is a polymeric carbohydrate consisting of a large number of glucose units joined by glycosidic bonds. It may possess any suitable molecular mass, and is represented by the chemical formula $(C_6H_{10}O_5)_n$.

Examples of modified cellulosic compounds include those which comprise a methyl cellulose or hydroxyethyl cellulose compound.

Certain compounds are particularly preferred for use as a viscosity modifier because their inclusion improves the processability of the composition into which they are incorporated without significantly adversely affecting the composition's swellability. Inventors have discovered that polyvinyl pyrrolidone, for example, is a preferred viscosity modifier because, when used in effective quantities at a suitable molecular weight, it sufficiently increases the viscosity of the composition into which it is incorporated to a level that is satisfactory for ensuring processing in optical fiber coating applications, all without inducing a significant detrimental effect on the ability of that composition to swell after introduction to water.

In an embodiment, the liquid water-swellable radiation curable coating composition for an optical fiber includes a polyvinyl pyrrolidone compound. The polyvinyl pyrrolidone may possess any suitable molecular weight, for example from 1 kilodalton (kDa) to 5 megadalton (MDa), or from 5 kDa to 1000 kDa, or from 50 kDa to 500 kDa, or from 75 kDa to 300 kDa, of from 100 kDa to 200 kDa. In an embodiment, in order to sufficiently increase the viscosity of the composition into which it is incorporated, the polyvinyl pyrrolidone possesses a high molecular weight, such as from 100 kDa to 300 kDa, or from 120 kDa to 200 kDa. In order to ensure sufficient viscosity modification without monopolizing the composition or impacting the properties of the entire formulation, a viscosity modifier of a sufficiently high molecular weight should be utilized in suitable amounts, as will be appreciated by those of ordinary skill in the art to which this invention applies.

The aforementioned molecular weights, along with any other molecular weight values expressed elsewhere herein shall be interpreted herein to mean number average molecular weight as determined by ASTM D5296-11 or other similar standard, unless otherwise specified.

The viscosity modifier may be present in any suitable amount by weight, relative to the weight of the entire water-swellable, radiation curable coating composition for an optical fiber, such as from about 5 wt. % to about 40 wt. %, or from about 8 wt. % to about 30 wt. %, or from about 10 wt. % to about 25 wt. %, or from about 15 wt. % to about 20 wt. %. The viscosity modifier should be included in any sufficient amount to ensure the composition into which it is incorporated possesses a viscosity suitable for processing on coating an optical fiber, such as the viscosities at which compositions are typically coated and cured onto an optical fiber on a draw tower or inking machine. In an embodiment, the viscosity modifier is included in an amount according to well-known methods to bring the viscosity of the water-swellable, radiation curable coating composition into which it is incorporated to a level at 25° C. from about 500 centipoise (cPs) to about 5000 cPs, or from about 600 cPs to about 4000 cPs, or from about 700 cPs to about 3000 cPs, or from about 800 cPs to about 2000 cPs, or from 800 cPs to 1200 cPs. In other embodiments, the viscosity modifier is included in an amount according to well-known methods to bring the viscosity of the water-swellable, radiation curable coating composition into which it is incorporated to a level at 25° C. from around 1200 to about 3000 cPs, or from about 1400 to about 2800 cPs, or from about 1600 to about 2700 cPs, or from about 1700 to about 2500 cPs. The exact viscosity of the formulation to be processed will be tuned according to values known in the art depending upon several factors, including the thickness of the water-swellable, radiation curable coating composition intended to be applied, along with the line or inking speed at which the coating application process occurs.

Water

The various components heretofore described in the compositions according to the present invention often involve the inclusion of water. That is, to ensure homogeneity or to avoid safety, environmental, or handling concerns, many of the components elsewhere described are provided commercially as liquids, which may take the form of aqueous solutions. As such, water will often be present (even if unintentionally) in the compositions according to the present invention. However, Inventors have determined that the swelling performance of the coating actually improves if water is added to the water-swellable radiation curable composition for coating an optical fiber before it becomes cured and subsequently exposed to external fluids. Furthermore, Inventors have surprisingly discovered that the performance-enhancing swellability effect of the added water continues as the amount of added water concentration concomitantly rises. Without wishing to be bound by any theory, Inventors theorize that this may occur due to the fact that the initial water content increases cyclization reactions, induces changes in chain conformation, or hydrolyzes the crosslinker present in the composition. Any one of such foregoing phenomena could contribute to an improvement in the relative swelling performance of the coating into which the additional water were incorporated.

Therefore in an embodiment, the water-swellable radiation curable coating composition for an optical fiber also includes an amount of water. The water may be present, in an amount by weight, relative to the weight of the entire water-swellable, radiation curable coating composition for an optical fiber of about 0.1 wt. % to about 50 wt. %, or from about 5 wt. % to about 45 wt. %, or from about 10 wt. % to about 40 wt. %, or from about 15 wt. % to about 35 wt. %. Although it tends to improve swell performance in increasing amounts, if the amount of added water becomes too high, the coating integrity (i.e. modulus) and cure speed will be adversely affected such that a viable coating for optical fiber applications cannot be formed.

Multifunctional Crosslinker

In order to ensure suitability in optical fiber applications, compositions according to the present invention should also include at least one crosslinker. That is, they include at least one reagent that is incorporated in the thermoset material in order to form additional network crosslinks, which are small region in a macromolecule from which at least four chains emanate, and which is formed by reactions involving sites or groups on existing macromolecules or by interactions between existing macromolecules. Such additional cross-linking is required to ensure the coating will retain significant structural integrity upon exposure to water. Inventors have discovered that if the coating does not maintain sufficient integrity after it has swelled, the coating will easily break apart into many small pieces during the swelling process. If it does so, the coating will enable channels or pathways for untrapped water to flow through, in turn limiting the overall longitudinal water blocking effectiveness in an optical fiber application. Inventors have surprisingly discovered that this reduced longitudinal water-blocking capacity may be observed despite the fact that the coating itself possessed sufficient swellability performance.

In a preferred embodiment, the water-swellable radiation curable coating composition for an optical fiber of the present invention comprises a crosslinker that induces additional network crosslinks to the crosslinked polymer chains formed by the ethylenically unsaturated network former component described elsewhere herein. Accordingly, such crosslinker comprises a free-radically polymerizable compound with an average of greater than 1.0 functional groups, wherein the functional groups are preferably acrylate or acrylamide functional groups. In a preferred embodiment, the crosslinker is multifunctional. As used herein, "multifunctional" means the pertinent component possesses an average of at least 1.9 functional groups per molecule.

In an embodiment, the multifunctional crosslinker comprises a difunctional compound, that is, a compound with an average number of functional groups of from 1.9 to 2.1, or preferably an average of 2.0 functional groups. In an embodiment, the ethylenically unsaturated component comprises a polyfunctional compound, that is, a compound with an average number of functional groups of at least 2.1.

To ensure optimum crosslinking capability, the crosslinker preferably comprises a multifunctional acrylate or a multifunctional acrylamide. In an embodiment, the multifunctional crosslinker is difunctional, or possesses an average of from 1.9 to 2.5 functional groups per molecule. In another embodiment, the multifunctional crosslinker is trifunctional, or possesses an average of from greater than 2.5 to 3.5 functional groups per molecule. In another embodiment, the multifunctional crosslinker is tetrafunctional, or possesses an average of from greater than 3.5 to 4.5 functional groups per molecule. In an embodiment, the multifunctional crosslinker is pentafunctional, or possesses an average of from greater than 4.5 to 5.5 functional groups per molecule. In another embodiment, the multifunctional crosslinker is hexafunctional, or possesses an average of from greater than 5.5 to 6.5 functional groups per molecule. Of course, multiple multifunctional crosslinkers of the above types may be used singly or in any combination. Also, the crosslinkers should be selected so that at least one possesses at least one functional group which is the same as at least the functional group of the monofunctional ethylenically unsaturated network-forming component used, as described elsewhere herein.

In an embodiment, the water-swellable radiation curable coating composition for an optical fiber may include an acrylate-functional crosslinker. Some non-limiting examples of such crosslinkers include ethylene glycol diacrylate, diethylene glycol diacrylate, triethylene glycol diacrylate, tetra ethylene glycol diacrylate, ethoxylated hexane diol diacrylate, trimethylolpropane ethoxylate, trimethylolpropane diacrylate, trimethylolpropane triacrylate, methyl ether diacrylate, neopentyl glycol diacrylate, 1,3-butanediol diacrylate, glycerol-1,3-diglycerolate diacrylate, 1,6-hexanediyl bis[oxy-2-hydroxy-3,1-propanediyl] bis acrylate, pentaerythritol triacrylate, or ethoxylated pentaerythritol triacrylate, 1,4 butanediol diacrylate or 1,6 hexane diol diacrylate, or any combinations thereof.

In another embodiment, the water-swellable radiation curable coating composition for an optical fiber includes an acrylamide-functional crosslinker. Some non-limiting examples of such crosslinkers include n,n-methylene bisacrylamide or an n-n-ethylene bisacrylamide.

Examples of additional multifunctional crosslinkers containing more than one double bond are polyethylene glycol diacrylates, ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, vinyl acrylate, divinyl benzene, divinyl succinate, diallyl phthalate, triallyl phosphate, triallyl isocyanurate, divinyl adipate, or tris(2-acryloylethyl)isocyanurate. In an embodiment, the multifunctional crosslinker containing more than one double bond possesses a number average molecular weight from 200 to 20,000 g/mol, or preferably from 200 to 15,000 g/mol, or even more preferably from 400 to 10000 g/mol.

Compositions of the present invention may include any suitable amount of crosslinker. Inventors have discovered, however, that there exist certain quantity ranges within which the multifunctional crosslinker component may be used in order to ensure the composition into which it is incorporated is simultaneously both optimally longitudinally water-blocking and suitable for use in an optical fiber coating process. If the network crosslink density is too low, the coating will not possess sufficient integrity to maintain a unitary structure during water exposure, in turn limiting the coating's ability to be sufficiently longitudinally water blocking in an optical fiber application. If the crosslink density is too high, however, the coating itself will not be sufficiently water-swellable.

In an embodiment, therefore, the multifunctional crosslinker is present in an amount by weight, relative to the weight of the entire water-swellable, radiation curable coating composition for an optical fiber, of from greater than 0.1 wt. % to less than 5 wt. %, more preferably from about 0.5 wt. % to about 3 wt. %.

Expressed alternatively in terms of molality, in another embodiment, the multifunctional crosslinker is present in an amount, relative to the entire composition, from about 3.8 to about 190 mmol/kg, or from about 19 to 110 mmol/kg. Additionally, in an embodiment the entire composition possesses from about 1.9 to about 95 acryloyl milliequivalents by virtue of the multifunctional crosslinker, or from about 9.5 to about 55 acryloyl milliequivalents by virtue of the multifunctional crosslinker. Stated alternatively, the total amount of multifunctional crosslinkers present in the total composition will contribute from about 1.9 to about 95, or from about 9.5 to about 55 acryloyl milliequivalents.

Additives

Compositions of the present invention may optionally further include one or more additives. Such additives may be added as is required for the particular design criteria and application requirements in which the particular water-swellable coating will be used.

In one embodiment, the water-swellable radiation curable coating composition for an optical fiber will, by virtue of its location as the outermost coated layer of the coated optical fiber, be useful for fiber identification purposes. As such, in an embodiment, the liquid, water-swellable composition for coating an optical fiber further includes an ink. In an embodiment where an ink is present in the composition, it is preferable that the composition is applied to the secondary coating of the optical fiber in the inking process, as this will ensure that no additional processing is required to impart the water-blocking characteristics to the coated optical fiber. Inks include a colorant such as a photoreducible dye, for example xanthene, benzoxanthene, benzothioxanthene, thiazine, pyronine, porphyrin or acridine dyes, and/or a trihalomethyl compound which can be cleaved by radiation. Similar compositions are described, for example, in U.S. Pat. No. 5,229,253. Inks may also include other conventional colorants such as fluorescent whiteners, pigments, or dyes.

In an embodiment the ink is present in an amount, relative to the weight of the entire water-swellable, radiation curable coating composition for an optical fiber of about 0.01 wt. % to about 5 wt. %, or from about 0.05 wt. % to about 2 wt. %, or from about 0.1 wt. % to about 1 wt. %.

Additives are also typically added to optical fiber coatings to achieve certain desirable characteristics such as improved shelf life, improved coating oxidative and hydrolytic stability, improved surface properties, and the like. There are many different types of desirable additives, and the invention discussed herein is not intended to be limited by these, nevertheless they are included in the envisioned embodiments since they have desirable effects.

Examples of these are fillers, slip additives, wetting agents or levelling assistants. Thermal inhibitors, which are intended to prevent premature polymerization, may also be used. Examples include hydroquinone, hydroquinone derivatives, p-methoxyphenol, beta-naphthol or sterically hindered phenols, such as 2,6-di(tert-butyl)-p-cresol. The shelf life in the dark can be increased, for example, by using copper compounds, such as copper naphthenate, copper stearate or copper octoate, phosphorus compounds, for example triphenylphosphine, tributylphosphine, triethyl phosphite, triphenyl phosphite or tribenzyl phosphite, quaternary ammonium compounds, such as tetramethylammonium chloride or trimethylbenzylammonium chloride.

In order to keep out atmospheric oxygen during the polymerization, paraffin or similar wax like substances can be added; these migrate to the surface on commencement of the polymerization because of their low solubility in the polymer, and form a transparent surface layer which prevents the ingress of air. It is likewise possible to apply an oxygen barrier layer.

Light stabilizers which can be added are UV absorbers, for example well known commercial UV absorbers of the hydroxyphenylbenzotriazole, hydroxyphenyl-benzophenone, oxalamide or hydroxyphenyl-s-triazine type. It is possible to use individual such compounds or mixtures thereof, with or without the use of sterically hindered relatively non-basic amine light stabilizers (HALS). Sterically hindered amines are for example based on 2,2,6,6-tetramethylpiperidine. UV absorbers and sterically hindered amines are for example:

2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(w-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl) phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-dit-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2-Hydroxybenzophenones include, for example, the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, include, as for example 4-tert-butylphenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

As other additives, in order to accelerate the photopolymerization, it is possible to add accelerators, coinitiators and autoxidizers such as thiols, thioethers, disulfides and phosphines, as are described, for example, in EP-A-438 123 and GB-A-2 180 358.

The photopolymerization can also be accelerated by the addition of photosensitizers, which shift or broaden the spectral sensitivity. These are, in particular, aromatic carbonyl compounds, such as benzophenone derivatives, thioxanthone derivatives, anthraquinone derivatives and 3-acylcoumarin derivatives, and also 3-(aroylmethylene)thiazolines, and also eosine, rhodamine and erythrosine dyes.

The curing procedure can be assisted, in particular, by compositions which are pigmented (for example with titanium dioxide), and also by adding a component which forms free radicals under thermal conditions, for example an azo compound such as 2,2'-azobis(4-methoxy-2,4-dimethylvaleronitrile), a triazene, a diazo sulfide, a pentazadiene or a peroxy compound, such as a hydroperoxide or peroxycarbonate, for example t-butyl hydroperoxide, as described in U.S. Pat. No. 4,753,817.

One or more of the aforementioned additives can be employed in compositions according to the present invention in any suitable amount, and may be chosen singly or in combination of one or more of the types enumerated herein. In an embodiment, the additive component is present in an amount, relative to the entire weight of the composition, of from about 0.01 wt. % to about 5 wt. %, more preferably from about 0.1 wt. % to about 2 wt. %. According to another embodiment, the one or more of the aforementioned additives are included in an amount from about 1 wt. % to about 5 wt. %.

Inventors have further discovered that the suitability of the composition for forming a water-swellable radiation curable coating composition for an optical fiber may be improved if some of the aforementioned components are formulated in specific quantities relative to each other. In an embodiment, therefore, the water-swellable radiation curable coating composition for an optical fiber possess specified molar ratios of the acrylic acid and the acrylic acid salt components to the monofunctional ethylenically unsaturated monomer component. In an embodiment, that ratio is from about 1:1 to about 9:1, or from about 1.05:1 to about 6:1, or from about 3:2 to about 4:1.

In another embodiment, the water-swellable radiation curable coating composition for an optical fiber possess specified molar ratios of the acrylic acid and the acrylic acid salt components to the multifunctional crosslinker component. In an embodiment, this ratio is from about 24:1 to about 100,000:1, or from about 32:1 to about 1000:1, or from about 50:1 to about 200:1.

In another embodiment, the water-swellable radiation curable coating composition for an optical fiber possess specified molar ratios of the monofunctional ethylenically unsaturated network former component to the multifunctional crosslinker component. In an embodiment, that ratio is from about 4:1 to about 1000:1, or from about 9:1 to about 200:1, or from about 20:1 to about 100:1.

Many of the aforementioned compositions contain compounds possessing acyl groups derived from an acrylic acid. In a preferred embodiment, they further do not contain compounds with acyl groups derived from methacrylic acid. Although SAP compositions involving methacrylates, methacrylate esters, and/or methacrylamides are commonly used to produce superior water swellable compositions, Inventors have determined that substantial use of methacrylates, methacrylate esters, and/or methacrylamides are not suitable for use in compositions of the present invention. This is because the substantial inclusion of methacrylate-functional components is thought to hinder the cure speed of the composition into which such components are included, such that the composition would no longer remain suitable for the high-speed cure requirements of modern optical fiber coating processes.

Therefore, in an embodiment, the composition is substantially free from a methacrylate component. In an embodiment, the composition is substantially free from a compound which possesses acyl groups derived from methacrylic acid. In an embodiment, the composition possesses less than 3%, or less than 2%, or less than 1%, or less than 0.5% by weight of a compound possessing acyl groups derived from methacrylic acid. In an alternative embodiment, the composition comprises one or more compounds possessing free-radically polymerizable functional groups. Such compounds possessing free-radically polymerizable functional groups may be from one of the existing compositional elements; e.g. the monofunctional ethylenically unsaturated network former or the multifunctional crosslinker. In such alternative embodiment, the free-radically polymerizable groups in all such compounds consist essentially of acrylate functional groups.

A second embodiment is an optical fiber coated with a primary coating, a secondary coating adhered to and surrounding the primary coating, and a water-swellable exterior coating adhered to and surrounding the secondary coating, wherein the water-swellable exterior coating is configured to buckle and detach from the secondary coating at least one point along a section of the coated optical fiber within 3 minutes, or within 2 minutes, or within 1 minute, or within 30 seconds, or within 20 seconds, or within 10 seconds, or within 5 seconds after the coated optical fiber has been submerged in deionized water.

A coated optical fiber according to an aspect of the second embodiment is shown in FIG. 1. Turning to FIG. 1, a cross-section of a coated optical fiber with a water-swellable exterior coating 10 according to an embodiment of the invention is depicted. Such coated optical fiber with the water-swellable exterior coating 10 includes a glass core 11 having diameter $D_1$, which is surrounded by a cladding 12 having diameter $D_2$. The cladding 12 is coated with primary coating 13, which itself is coated with secondary coating 14. Finally, a water-swellable coating layer 15 surrounds and contacts the secondary coating, thereby forming the exterior layer of the coated optical fiber. The diameter of optical fibers onto which the water-swellable coating layer 15 is applied is typically around 240 microns, although any size coated optical fiber may be used in accordance with the principles of the current invention, such as 180-240 µm, or from 240-250 µm, for example.

Inventors have discovered that in order to design a coating that possesses the most efficient and effective water blocking characteristics possible, it is important not only for the water-swellable coating to be sufficiently swellable (in terms of rate and total amount) and strong to prevent coating disintegration after swelling, as described herein, supra, but also for such coating to be configured to buckle and detach from the coated optical fiber after it has been exposed to water and begins to swell.

Detachability of a coating is desirable because it enables the maximization of a particular coating's swelling potential. In the context of optical fiber applications, two coatings of similar film swell capability will not perform identically in terms of longitudinal water-blocking, all else being equal, if one of the coatings is detachable from the coated fiber while the second is not. In this instance, the first (detachable) coating on fiber will exhibit a higher volumetric swell ratio—and a superior longitudinal water-blocking performance—than the second. Inventors surmise this is because the detachability of a coating is required because it enables the coating to swell unhindered in all directions. Even an extremely water-swellable coating which does not detach from the previously-adhered layer will only be able to swell with a single degree of freedom (i.e. a radially outward thickness increase). That is because such a coating's contact with the previous layer will constrain further swelling in tangential (i.e. along the circumference) and axial (along the length of the coating) dimensions. If, however, the coating detaches from the prior layer, it will have three degrees of freedom, such as along the outer diameter, the inner diameter, and length. To restate, therefore, the actual volumetric swelling with all three degrees of freedom will be significantly higher than if the swelling occurred with only a single degree of freedom, even for two coatings with identical film swellability profiles.

The detachment problem is particularly acute in the optical fiber coating context because of the geometry of the successive coatings themselves. That is, localized forces induced by the exterior coating's swelling process may not overcome the significant adhesion to the adjacent layer due in part to the significant contact patch that is inherently formed between two successive coatings in a thin, elongated cylindrical fiber. Regardless, the swelling process builds up axial compressive stress in the coating. If the compressive force exceeds the coating's critical buckling force, the swellable layer will buckle (i.e. form periodical patterns along the axial direction initially with the peak of the buckle shifted in a direction away from the adjacent coating layer) and eventually detach from the fiber, thereby inducing further swelling.

Inventors have discovered that both the axial compressive stress and critical bucking force may be adjusted depending upon the particular coating's chemistry, processing, and construction. Therefore, Inventors have surprisingly discovered that a particular water-swellable coating may be tuned for maximum longitudinal water-blocking performance if it is configured to detach from the previously adhered layer according to several factors. These factors are not intended to be limiting, however, as once this surprising link has been recognized, other ways to configure detachability can be envisioned.

A first factor to configure for detachability is via the chemistry of the coating itself. Preferred embodiments of coating with superior swellability and structural integrity are described elsewhere herein, supra. The coatings described herein facilitate the maximum amount of axial stress because they exhibit superior swellability in coated optical fiber applications.

A second factor to configure for detachability is via the thickness of the water-swellable coated layer itself. This may be tuned according to known processing methods. Inventors have surprisingly discovered that coatings with thicknesses within certain prescribed ranges facilitate maximum detachability. In an embodiment, therefore, the water-swellable exterior coating possesses a thickness from 0.1 to less than 20 microns, or from 1 to 20 microns, or from 0.2 to 10 microns, or from 0.3 to 5 microns, or from 2 to 5 microns, or from 1 to 4 microns. If the thickness becomes too small, sufficient swelling may not occur. If it becomes too large, consistent detachability may not be ensured quickly enough, and the amount of fibers permissible in a small size buffer tube configuration may be reduced via each coating's relatively enlarged diameter.

Yet another factor which positively influences a water-swellable exterior coating's overall longitudinal water-blocking performance is an optimization of the conditions under which that coating is coated and cured. A relative reduction in the cure dose imparted into the coating has been observed to have an effect on that coating's ability to subsequently detach from the coated fiber under water ingression conditions. It is believed, without wishing to be bound by any theory, that this occurs because the reduction in cure dose results in a partially undercured coating with a reduced crosslink density, which in turn has the effect of imparting a lower swelling-induced compressive stress build-up. In such case, the localized axial stress imparted by swelling is not always significant enough to overcome the critical buckling force, and so buckling and detachment does not occur, or does not occur fully. Therefore, in an embodiment, the coating is processed with a cure dose sufficient to impart a top surface percent reacted acrylate unsaturation % RAU of at least 80%, more preferably at least 90%, or at least 95%, or at least 98%, or at least 99% according to an FTIR method, which is described in, i.a., WO2011/075549 ("The degree of cure of the secondary coating on an optical fiber by FTIR"), which is hereby incorporated by reference in its entirety.

Inventors have also determined that in addition to the cure dose, the cure intensity may be an important processing parameter which may have an impact on the detachability, swellability, and/or longitudinal water blocking performance of the coating. It has been determined that, ceteris paribus, higher UV intensities will result in shorter kinetic chain lengths and thus lower crosslinking concentrations. This tends to result in an improvement of the swellability and detachability of the coating itself. However, if UV intensities become too high, the ever-shorter kinetic chain lengths result in an impermissibly low crosslink density, which tends to yield a coating which exhibits reduced integrity and becomes more susceptible to disintegration or dissolution during the swelling process.

Other potential factors include the aforementioned crosslink density of the polymer network in the cured water-swellable coating itself, along with the coating's viscosity during the coating process, to name a couple.

The aforementioned factors should be tuned to ensure that the water-swellable radiation curable coating for an optical fiber according to the present invention is sufficiently swellable regardless of whether it is configured to buckle and/or detach from the coated fiber. This swellability profile is a necessary (but not sufficient) property which the coating must possess to ensure that it facilitates the construction of a system that is sufficiently longitudinally water-blocking. This property may be measured by determining the cured coating's film swelling ratio. In an embodiment, the composition possesses a film swelling ratio of greater than about 5 times (×), or greater than about 31×, or greater than about 56×, or greater than 80×, or greater than 100×, or greater than 200×, or greater than 220×. In another embodiment, the radiation curable coating composition possesses, when coated on a 10 mil drawdown film on a glass plate, and cured by 3 passes of 1 J/cm$^2$ per pass with Fusion 600 W/in D lamps imparting an irradiance of 8 W/cm$^2$ on a conveyor system, a film swelling ratio of at least 5×, or at least 10×, or at least 20×, or at least 30×, or at least 40×, and less than 300×, or less than 200×, or less than 100×, or from 5× to 250×, or from 20× to 225×, or from 10× to 100×, or from 20× to 100×, or from 40× to 80×, or from 35× to 250×.

A third embodiment is a method of applying a liquid, water-swellable coating to a coated optical fiber comprising the steps of providing a coated optical fiber, applying a liquid water-swellable coating composition to an exterior surface of a section of coated optical fiber to form a coated optical fiber with a liquid water-swellable exterior coating composition, and exposing the coated optical fiber with the liquid water-swellable exterior coating composition to a light source capable of emitting ultraviolet radiation to affect curing of said liquid water-swellable exterior coating composition, to form a coated optical fiber with a water-swellable exterior coating, wherein the water-swellable exterior coating is configured to buckle and detach from the coated optical fiber at least one point along the section of the coated optical fiber within 3 minutes, or within 2 minutes, or within 1 minute, or within 30 seconds, or within 20 seconds, or within 10 seconds, or within 5 seconds after the time from which the coated optical fiber with the water-swellable exterior coating has been submerged in deionized water.

Processes of providing coated optical fibers are well-known and are described elsewhere herein, supra. A particular method of coating optical fibers involves the steps of drawing a glass optical fiber through a draw tower; applying a primary coating composition onto the surface of the glass optical fiber; optionally, exposing the primary coating composition to a first light source capable of emitting ultraviolet radiation to affect curing of said primary coating composition; applying a secondary coating composition to the primary coating composition; and finally exposing the primary coating composition and the secondary coating composition to at least one of the first light source and a second light source capable of emitting ultraviolet radiation to affect curing of said primary coating composition and said secondary coating composition. Other general methods of applying dual layers of coating compositions to a moving glass fiber are well-known in the art, and are disclosed in U.S. Pat. No. 4,474,830 to Taylor and U.S. Pat. No. 4,851,165 to Rennell et al. Newer fiber design concepts can be found in U.S. Pat. No. 8,837,892, US 2014/0294355, and US 2015/0071595.

In a preferred aspect of the third embodiment, the water-swellable exterior coating is applied to the coated optical fiber so that it surrounds and contacts the secondary coating, but it may also be applied to any other layer of the fiber, such as the primary layer, or even a third, fourth, or fifth layer, etc., as long as the water-swellable exterior coating remains the outermost layer of the finished coated fiber.

The water-swellable exterior coating may be applied to the optical fiber as an outermost coating on top of the existing fiber optic coatings in the drawing process itself, or it may be applied in a subsequent operation. In an embodiment, the water-swellable coating is applied to the coated optical fiber in an operation independent from the fiber drawing process itself. If the water-swellable exterior coating is applied to the coated optical fiber in a subsequent operation, the coated optical fiber is often provided in a spool, with a portion of the fiber wound thereon.

In a preferred embodiment, the water-swellable exterior coating is applied to the optical fiber via a subsequent inking operation in an inking machine. In such a process, after the optical fiber has been provided, at least a portion thereof is subsequently fed into an inking machine. Of course, if the coated optical fiber is provided on a spool, the fiber will be unwound prior to being fed into the inking machine, in a method as is well-known in the art to which this invention applies. Once the coated optical fiber is fed into the inking machine, the water-swellable coating may then be applied as a liquid composition to the surface of the section of coated optical fiber to form a coated optical fiber with a liquid water-swellable exterior coating.

The speed and thickness at which the water-swellable exterior coating is applied onto the coated optical fiber may be any suitable value. In an embodiment, the process is carried out at a speed of from 20 m/min to about 1000 m/min, or from about 50 m/min to about 500 m/min. In an embodiment, the water-swellable coating may be applied to the coated optical fiber at a thickness of 0.1 to less than 20 microns, or from 1 to 20 microns, or from 0.2 to 10 microns, or from 0.3 to 5 microns, or from 2 to 5 microns, or from 1 to 4 microns. Care should be taken to ensure that the thickness is applied as uniformly as is practically possible, in a manner well-known in the art.

The next step in the typical inking process involves exposing the coated optical fiber with the ink (or in the case of the present invention, the water-swellable exterior coating with or without an optional ink) to a light source capable of emitting ultraviolet radiation to affect curing of the liquid water-swellable exterior coating composition, in order to form a coated optical fiber with a cured water-swellable exterior coating. As described above, care should be taken to process the liquid water-swellable coating composition with appropriate levels of UV intensity and dose, so as to ensure optimum curing and sufficient performance. In an embodiment, therefore, the light source is configured so as to impart an irradiance, at a surface of the liquid water-swellable exterior coating composition, or at least about 1 W/cm$^2$; more preferably from about 1 W/cm$^2$ to about 9 W/cm$^2$, or from about 2 W/cm$^2$ to about 6 W/cm$^2$, or from about 3 W/cm$^2$ to about 5 W/cm$^2$.

Finally, the coated optical fiber with the cured water-swellable exterior coating may then be rewound onto another spool to form a section of an at least partially rewound coated optical fiber. The coating should be processed so as not to exhibit excessive tackiness, which will cause disparate adjoining sections of the coated fiber in the re-wound spool to stick together.

In another embodiment, the coated optical fiber with the cured water-swellable exterior coating may alternatively be fed directly into the buffer tube during the extrusion process. This direct-feed approach may be useful if the water-swellable exterior coatings are too tacky and stick to each other during the winding process.

A fourth embodiment is a buffered bundle of optical fibers, comprising a flexible buffer tube possessing a length and a cavity over at least a portion of the length, and a plurality of coated optical fibers disposed within the cavity of the flexible buffer tube along the portion, wherein at least one of the plurality of coated optical fibers comprises a water-swellable exterior coating, further wherein said water-swellable exterior coating is configured to buckle and detach from the coated optical fiber at least one point along a section thereof within 3 minutes, or within 2 minutes, or within 10 seconds, or from 1 to 60 seconds, or from 10 seconds to 2 minutes, or from 3 seconds to 10 seconds from a time at which the cavity becomes filled with deionized water.

Inventors have surprisingly discovered that due to the enhanced performance and potential efficiency imparted by the water-swellable coatings and compositions described elsewhere herein, it is possible to design a bundle of fibers that is sufficiently longitudinally-water blocking without the requirement that each individual fiber is coated with a cured water-swellable composition. The advantage of this is that it enables a cable design which minimizes the expense associated with utilizing additional coating materials. Furthermore, it enables a reduction in the volume taken up by the coated fibers, an aspect which is of particular importance in small size buffer tube configurations, wherein it is desirable to maximize the density of optical fibers employed.

In an embodiment, therefore, less than 100% of the optical fibers in the bundle are coated with a water-swellable exterior coating. In embodiment, less than 90%, or less than 80%, or less than 70%, or less than 60%, or less than 50%, or less than 40%, or less than 30%, or less than 20% of the optical fibers in the bundle are coated with a water-swellable exterior coating. In another embodiment, from 10% to 90%, or from 20% to 75%, or from 20% to 50%, or from 25% to 50% of the coated optical fibers comprise a water-swellable exterior coating. Of course, even assuming that each water-swellable exterior coating is configured for optimum detachability, integrity, and swellability, the amount of fibers which require such a water-swellable exterior coating in a given cable design to accomplish sufficient longitudinal water-blocking performance is dependent upon the total free volume in the buffer tube, which is influenced by the diameter of the buffer tube, the diameter of each individual coated optical fiber, the number of fibers in the tube, and the thickness of the water-swellable exterior coating, to name a few factors.

Despite the foregoing, Inventors have surprisingly discovered that sufficient longitudinal water-blocking performance can be achieved even in systems in which the coatings themselves, after swelling, are not configured to fill the entire free volume in the buffer tube. This seemingly paradoxical result is believed to be due to the present inventive coatings' ability to detach and re-orient inside the buffer tube upon water immersion. Thus, rather than filling the entire three-dimensional void, such coatings swell and re-orient sufficiently to block at least one cross section of the buffer tube, thereby trapping water in pockets and preventing it from traversing further across the length of the cable. Thus, in an embodiment, the buffered bundle of optical fibers possesses a quantity of water-swellable coating material which is configured to swell to fill less than 100% of the free volume in the buffered bundle, or less than 90% of the free volume, or less than 80%, or less than 70%. In an embodiment, the water-swellable coating material is configured to swell to fill at least 50%, or at least 60%, or at least 70%, or at least 80% of the free volume in the buffered bundle.

Thus, the utilization of the aforementioned exterior water-swellable coatings according to the present invention enables for more efficient "dry cable" designs than previous systems. That is in part due to the fact that the total volume of the water-swellable exterior coating material used is less than that of traditional yarns, tapes, and/or SAP-coated filaments, enabling for a maximum fiber density to be utilized, whilst maintaining or even improving longitudinal water-blocking performance.

The following such examples further illustrate the invention but, of course, should not be construed as in any way limiting its scope.

EXAMPLES

These examples illustrate certain embodiments of the instant invention. Table 1 describes the various components of the base composition used in all of the examples of Table 2.

First, a basic salt (50 wt. % NaOH solution from base composition of Table 1) was made by dissolution (NaOH in equivalent weight of water for base composition). The solution, when used in a sequential step, may still possess slight amounts of solid particulate, however, this would not be expected to materially influence the homogeneity of the final solution. In parallel, a viscosity modifier (for the base composition, a solution of 35% polyvinyl pyrrolidone with a number average molecular weight of approximately 160 kDa in water was used) was concentrated using a rotary evaporator to 50 wt. %.

The low viscosity base formulation (SAP-f) was made by adding a prescribed amount of acrylic acid (89 g acrylic acid was used in base composition), a monofunctional ethylenically unsaturated network former (138.7 g HPA in base composition), and water (22.6 g distilled water in base composition) in a 500 mL Erlenmeyer on a heating plate with temperature control in the solution. Subsequently, a prescribed amount of the basic salt solution (67.7 g of the 50 wt. % NaOH solution per the base composition) was slowly added. During this process, precipitate initially formed and subsequently dissolved and the temperature increased, obviating the requirement to initially heat the solution. During the addition of the basic salt, the temperature was maintained between 50° C. and 55° C. SAP-f was obtained after full addition of the basic salt solution and subsequent dissolution of any visibly-remaining precipitate.

Since the 50 wt. % viscosity modifier (PVP solution of 74.3 g in the base composition) was too viscous to stir, an equivalent amount (74.3 g in the base composition) of the SAP-f solution was added to dilute the system and make it pourable.

Next final formulations were made by adding the components below in a flask and put in a FlackTech mixer for 4 min, after which the final homogenous solutions were obtained.

TABLE 1

| Function in Formula | Chemical Descriptor | Supplier/ Manufacturer | Amount used (Parts by weight) | Amount in final formulation (wt. %) |
|---|---|---|---|---|
| Acrylic Acid | Acrylic acid | Alfa Aesar | 28.8 | 19 |
| Basic salt | Sodium hydroxide (50% in water) | Merck | 10.24 | 0 |
| Acrylic Acid Salt | Sodium acrylate | Synthesized during experiment | 0 | 12 |
| Monofunctional ethylenically unsaturated network former | hydroxypropyl acrylate | Sigma-Aldrich | 21.12 | 21 |
| Photoinitiator | Diphenyl(2,4,6-trimethylbenzoyl) phosphine oxide | Sigma-Aldrich | 1 | 1 |
| Viscosity modifier | Polyvinyl pyrrolidone, MW 160 KDa, 35% in water | Sigma-Aldrich | 18 | 18 |
| Water | $H_2O$ | Multiple | 21.84 | 29 |
| Multifunctional Crosslinker | triethylene glycol diacrylate | Sigma-Aldrich | — | — |

Examples 1-11

Next, multiple water-swellable compositions were formulated according to the method described herein by adding varying amounts of the multifunctional crosslinker triethylene glycol diacrylate to the base composition described above (and depicted in Table 2 under the heading "X-linker"). The coating compositions as described in Table 2 were applied and cured on inking line as a thin outer SAP layer on a commercial dual layer coated optical fiber with an outside diameter of 240 µm, under the curing conditions of a Fusion 600 W/in 0.11 mm Microwave D bulb at 100 m/min, with a nitrogen purge with a flow rate of 20 liters per minute, at varying intensity levels and different coating thicknesses. For each sample of selected composition/processing/construction type, multiple performance variables are reported below, including the composition's film water swelling ratio, and its buckling and detachability performance on fiber observed under microscope. Finally, each coating construction type was subjected to a longitudinal water blocking test. For each example, the overall result from the water blocking test was recorded. The results of each test are reported below in Table 2.

Longitudinal Water Blocking Tube Test

Figure 2:
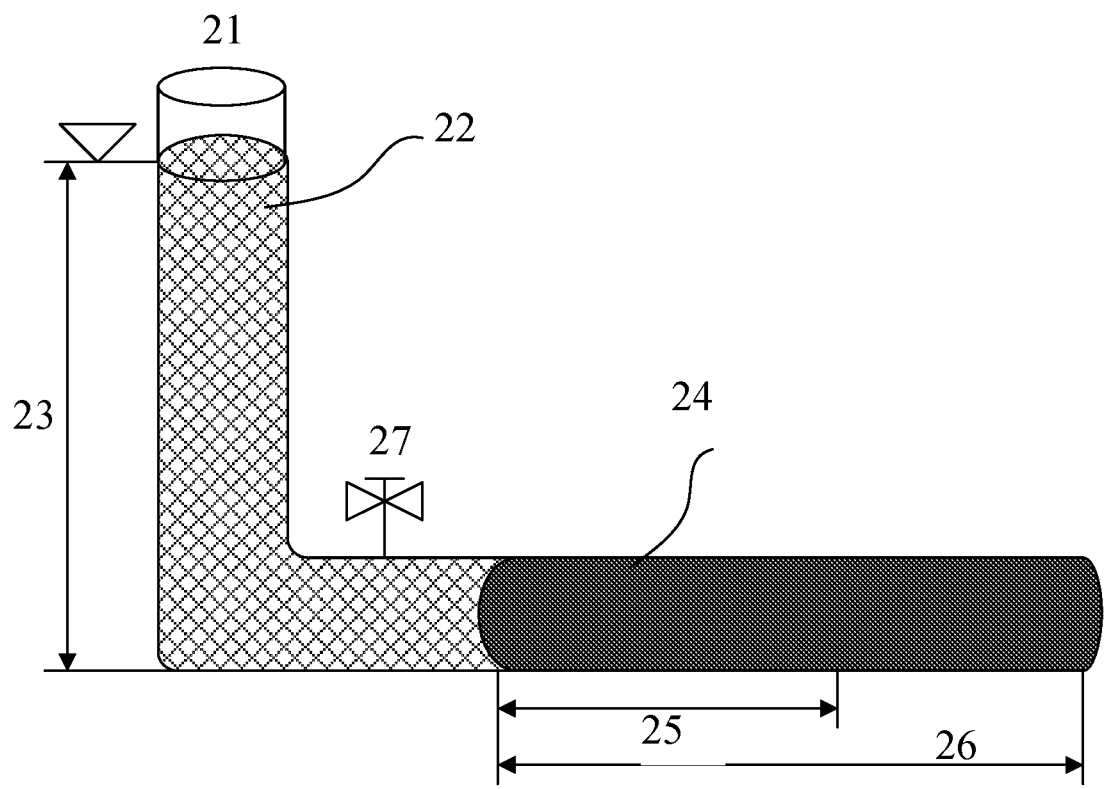
FIG. 2 is a schematic of a test used herein to evaluate the relative longitudinal water-blocking performance of various coatings, coated optical fibers, and/or cable designs.

For the longitudinal water blocking test, a set-up depicted in FIG. 2 was used. In the set-up 20, five coated optical fibers with varying numbers of SAP coatings applied thereto via an inking machine (not shown) were inserted manually in a PTFE tube 24 with an inner diameter of 1 mm and a length 26 of 75 cm. The number of fibers upon which the SAP coatings were applied, along with the applied thickness of each, is depicted in Table 2, it being understood that the thickness of each SAP coating was applied uniformly to every fiber per a given example. The tube 24 was connected via a needle and rubber tubing to a burette 21 (itself having a 1 cm inner diameter) and filled with deionized water with a trace amount of dye 22 to a height 23 of 50 cm. At t=0, the valve 27 of the burette 21 was opened, allowing the water to flow into the fiber-filled tube 24. The water front could visually be observed to stop or progress over time.

The initial ingression 25, which is defined as the observed length of water ingression within 3 minutes, was observed. Any further water ingression was observed over a period of 1 hour, after which the final traversal distance was recorded.

Finally, a rating for each sample was then assigned based upon the observed final traversal distance ("D") per the scale shown below, with the rating then recorded in Table 2 under the column headed by "Water Block":

| Distance of water ingression after 1 hr | Rating |
|---|---|
| D ≤ 10 cm | Excellent |
| 10 cm < D ≤ 30 cm | Good |
| 30 cm < D ≤ 60 cm | Average |
| D > 60 cm | Poor |

SAP Coating On-Fiber Buckling and Detaching Test

A single SAP-coated fiber was placed on a slide under a microscope with 40× or 100× magnification. Then, a droplet of deionized water was placed onto the fiber and the swelling of the SAP coating was observed under the microscope. Photographs were taken at specified intervals. The nature of the swelling and change in the SAP coating was then observed and reported in Table 2, with values recorded under the column headings "Buckle" and "Detachability." It was observed that for a few samples, a phenomenon of disintegration occurred, meaning the coating resembles an almost fluid-like jelly and easily broke apart into many small pieces. Even if accompanied by a detachment, this is not a desired result.

Film Swell Ratio Test

First, a 10 mil drawdown was provided, wherein such drawdown was cured by 3 passes of 1 J/cm$^2$ dose per pass under Fusion 600 W/in D lamp on conveyor system with an irradiance of approximately 8 W/cm$^2$ as measured by an ILT490 radiometer. Next, a piece of the drawdown sample was cut to a square having a size of approximately 2 cm×2 cm. Then, the sample was weighed to establish a dry weight. After this, the sample was then soaked in deionized water. After 30 minutes of soaking, the water was filtered out with a WypAll® cleaning wipe. Then, the soaked sample was again weighed to provide a swelled weight. The weight gain ratio was then calculated by determining the value of the swelled weight divided by the dry weight. Because it is known that the SAP film possesses a density which is similar to that of water, the volume swell ratio was approximated to be the same value as the calculated weight gain ratio and was recorded in the column headed by "Swell ratio" in Table 2.

TABLE 2

| Sample | X-linker | Lamp Power | SAP coating thickness (µm) | # SAP Coated Fibers | Buckle | Detachability | Swell ratio | Water Block |
|---|---|---|---|---|---|---|---|---|
| 1 | 0.1% | 100% | 3.5 | 5 | No | Detach & disintegrate | Disintegrate | Poor |
| 2 | 0.1% | 67% | 3.5 | 5 | No | Detach & disintegrate | Disintegrate | Poor |
| 3 | 0.5% | 100% | 3.5 | 5 | Partial | Partial Detach | 78 | Good |
| 4 | 0.5% | 67% | 3.5 | 5 | Partial | Partial Detach | 78 | Average |
| 5 | 1% | 100% | 3.5 | 5 | Yes | Detach | 40 | Excellent |
| 6 | 1% | 67% | 3.5 | 5 | No | No | 40 | Poor |
| 7 | 5% | 100% | 3.5 | 5 | Yes | Detach | 5 | Average |
| 8 | 5% | 67% | 3.5 | 5 | No | No | 5 | Poor |
| 9 | 1% | 100% | 1 | 5 | Yes | No | 40 | Poor |
| 10 | 1% | 100% | 10 | 5 | Yes | Detach | 40 | Average |
| 11 | 1% | 100% | 3.5 | 3 (+2 uncoated) | Yes | Detach | 40 | Good |

Examples 12-24

Additional examples were then prepared to show the effects of using different amounts and/or types monofunctional ethylenically unsaturated network formers, viscosity modifiers, and multifunctional crosslinkers on the swellability of the associated water-swellable exterior coating composition. Such compositions 12-24 were prepared in accordance with the general method described above with respect to the formulation of the base composition used in Table 1, albeit with the reagents and relative quantities differing, as is prescribed in Tables 3 and 4 below. The appearance of each coating was recorded, and the relative swell performance value was recorded under the row headed by "Swell Ratio," with such test performed in accordance with the film ratio swell test method described above.

TABLE 3

| Function in formula | Component (and abbreviation) | Supplier/ Manufacturer | CAS # |
|---|---|---|---|
| Acrylic acid | Acrylic acid | Alfa Aesar | 79-10-7 |
| Basic Salt | Sodium hydroxide 50% (NaOH) | BDH | 1310-73-2 |
| Water | Deionized water (DI water) | DSM Desotech | 7732-18-5 |
| Mono-functional ethylenically unsaturated network former | 2-(2-ethoxyethoxy)ethyl acrylate (EOEOA) | TCI America | 7328-17-8 |
| | N-isopropylacrylamide (NIPAM) | TCI America | 2210-25-5 |
| | 2-acrylamido-2-methyl-1-propanesulfonic acid (AMPS) | TCI America | 15214-89-8 |
| | Hydroxypropyl Acrylate (HPA) | TCI America | 25584-83-2 |
| | 1-Vinyl-2-pyrrolidone (NVP) | TCI America | 88-12-0 |
| Viscosity Modifier | 35% polyvinylpyrrolidone K60 in water (PVP/H$_2$O) | TCI America | 9003-39-8 |
| | Polyethylene glycol, Mw 250,000 to 4,000,000 (PEO) | Acros Organics | 25322-68-3 |
| Multi-functional crosslinker | Miramer M232 (Mw258) triethylene glycol diacrylate (TGD) | Miwon Specialty Chemical | 1680-21-3 |
| | Divinyl adipate | TCI America | 4074-90-2 |
| | polyethylene glycol diacrylate (PEGDA), Mw 8000 | Alfa Aesar | 26570-48-9 |
| Photo-initiator | Diphenyl(2,4,6-trimethylbenzoyl) phosphine oxide (TPO) | IGM Resins | 75980-60-8 |
| Additive | wetting agent; PEG, PPG-18, 18 Dimethicone (DC-190) | Dow Corning | Proprietary |
| Additive | nonreactive silicone glycol copolymer surfactant (DC-57) | Dow Corning | 70914-12-4 |

TABLE 4

All amounts listed in parts per weight

| Component | 12 | 13 | 14 | 15 | 16 | 17 | 18 | 19 | 20 | 21 | 22 | 23 | 24 |
|---|---|---|---|---|---|---|---|---|---|---|---|---|---|
| Acrylic acid | 24.46 | 26.18 | 26.04 | 39.27 | 29.45 | 27.90 | 23.79 | 28.14 | 41.91 | 33.09 | 28.24 | 28.57 | 27.49 |
| NaOH | 10.29 | 10.21 | 16.78 | 13.98 | 10.75 | 10.04 | 8.56 | 9.35 | 15.30 | 12.08 | 10.31 | 10.43 | 9.97 |
| DI water | 5.44 | 7.11 | 13.88 | 15.62 | 3.58 | 4.28 | 16.43 | 3.95 | 5.10 | 23.63 | 3.44 | 3.48 | 5.95 |
| EOEOA | 25.26 | | | | 21.66 | | | | 30.82 | 24.33 | 20.77 | 21.01 | 10.51 |
| NIPAM | | 19.25 | | | | 20.52 | | | | | | | |
| AMPS | | | 12.58 | | | | 17.50 | | | | | | |
| HPA | | | | | | | | 10.65 | | | | | 9.67 |
| NVP | | | | | | | | 10.65 | | | | | |
| PVP/H$_2$O | 32.73 | 35.29 | 28.93 | 29.17 | 32.73 | 35.29 | 31.76 | 35.29 | | | 35.29 | 19.05 | 25.80 |
| PEO | | | | | | | | | 4.90 | 4.90 | | | |
| TGD | 0.91 | 0.98 | 0.89 | 0.98 | 0.91 | 0.98 | 0.98 | 0.98 | 0.98 | 0.98 | 0.98 | | 0.47 |
| PEGDA | | | | | | | | | | | | 16.40 | 8.20 |
| TPO | 0.91 | 0.98 | 0.89 | 0.98 | 0.91 | 0.98 | 0.98 | 0.98 | 0.98 | 0.98 | 0.98 | 1.06 | 1.47 |
| DC-190 | | | | | | | | | | | | | 0.33 |
| DC-57 | | | | | | | | | | | | | 0.16 |
| Total | 100 | 100 | 100 | 100 | 100 | 100 | 100 | 100 | 100 | 100 | 100 | 100 | 100 |
| Appearance | hazy | clear | clear | clear | hazy | clear | clear | clear | hazy | hazy | hazy | clear | clear |
| Swell Ratio | 32 | 69 | 41 | 52 | 61 | 62 | 35 | 44 | 37 | 65 | 51 | 222 | 80 |

DISCUSSION OF RESULTS

Figure 3A:
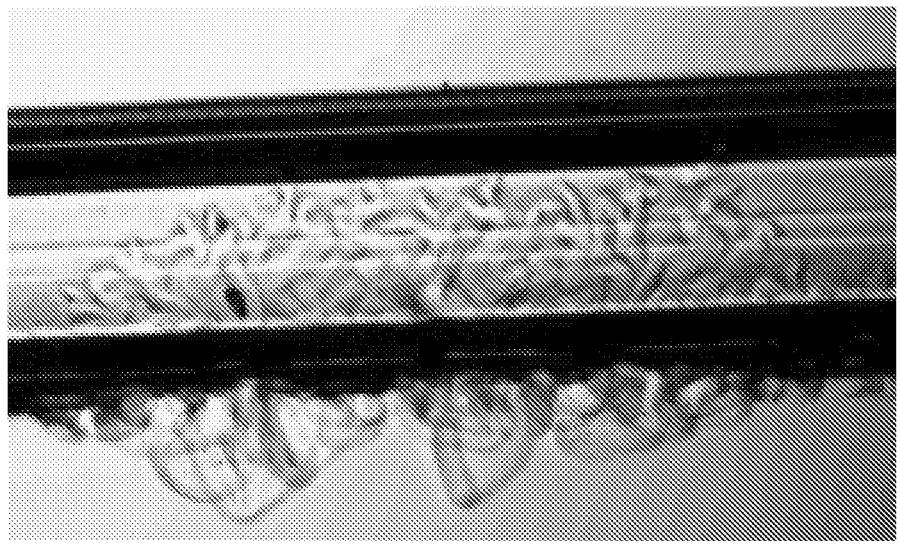
FIG. 3a and FIG. 3b depict microscope images of an SAP-coated fiber according to the present invention with buckling and detaching behavior.
Figure 3B:
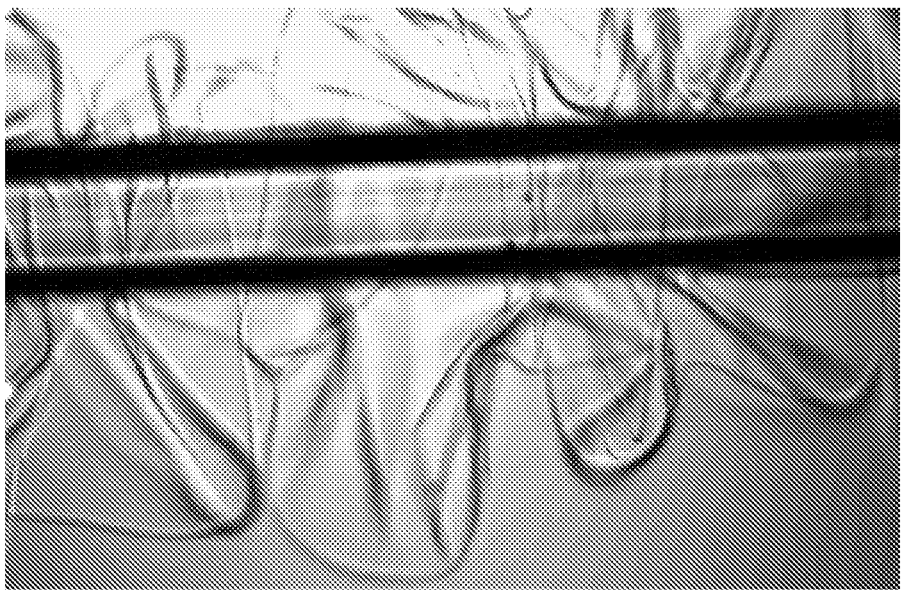
Figure 4:
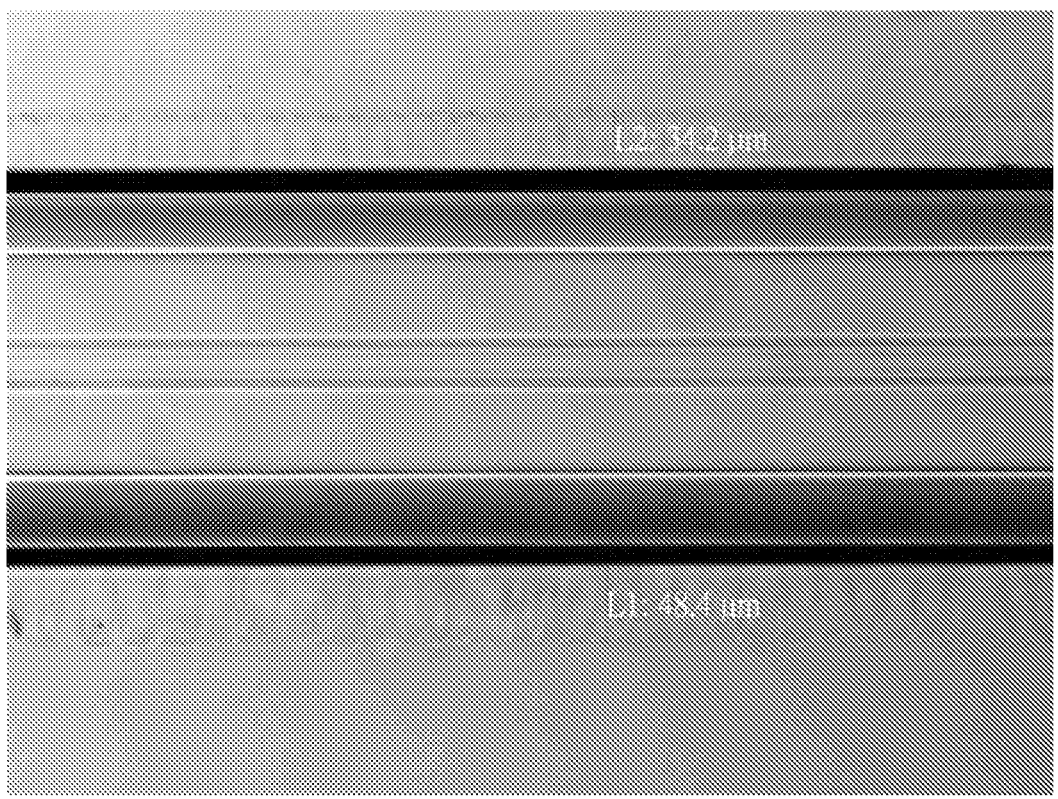
FIG. 4 depicts a microscope image of an SAP-coated fiber that exhibits neither buckling nor detaching behavior.

FIGS. 3a and 3b depict images of Example 5 from Table 2 at two different time intervals after water exposure. Example 5 represents an example of a fiber which has buckled and detached after water immersion. FIG. 3(a) provides a depiction approximately 3 seconds after the SAP-coated fiber had been immersed in water. As can be seen, the SAP coating layer exhibited substantial buckling behavior, forming a pattern that closely resembles a high frequency periodic pattern along the axial direction with the peak of the buckles lifted away from the secondary coating. At the maximum buckling moment, the average distance between the peaks and valleys of the buckles was at least 10 µm. Beyond this, the SAP coating layer substantially detached from the secondary coating, with the buckles relaxed and the film fully swelled. This phenomenon is depicted in FIG. 3(b), which was a photograph taken at around 5 seconds after the water immersion. FIG. 4, by contrast, shows an example of an SAP-coated fiber that exhibits no buckling and no detaching from the coated fiber. It corresponds to Example 6 from Table 2. This SAP coating layer showed a substantial thickness increase from its initial 3.5 µm to approximately 41 µm. Although the coating exhibited a slight wrinkling pattern, no portion of the film of the SAP layer lifted from the associated secondary coating, even an immersion period of 5 minutes. It did not reach the buckling threshold where the compressive axial force needs to overcome the critical buckling force.

Figure 5:
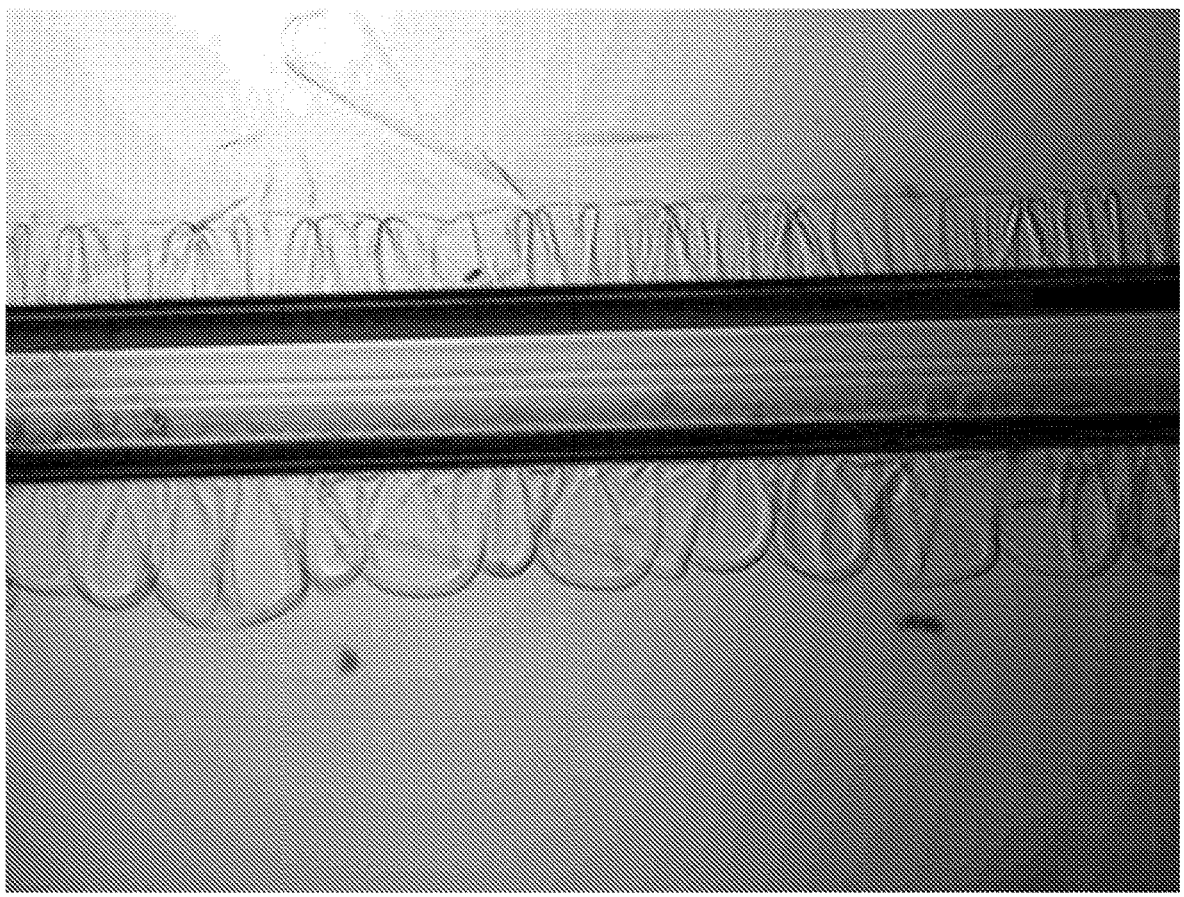
FIG. 5 depicts a microscope image of an SAP-coated fiber that has buckled but not detached from its associated coated fiber after having reached its equilibrium swelling state.

FIG. 5, meanwhile, shows an example of a fiber that has buckled, but not detached, from its associated coated fiber after having reached its equilibrium swelling state. This figure is a photograph of Example 9 from Table 2, wherein an SAP layer of 1 µm was applied to a coated fiber. The swelling of the 1 micron SAP coating layer was effective in forming periodic buckles, however the buckles of the thin SAP coating layer were stable and did not further detach from fiber to enable the attainment of a relaxed, fully swelled state, as was depicted in FIG. 3(b). Example 10 from Table 2, with its relatively thick SAP layer of 10 µm, on the other hand, did show substantial buckling and a detachment from the associated coated fiber. This enabled it to reach a fully swelled state, however it took a longer time to do so than Example 5. Here, the buckling stage lasted longer (to approximately 30 seconds); only enabling the coating of Example 10 to reach a fully detached and fully relaxed swelled stage after about 60 seconds. This relative delay resulted in the inferior performance of Example 10 in the longitudinal water blocking test relative to that of Example 5, even though Example 5 possessed a thinner SAP coating layer.

It was observed that the swelling behavior of samples assigned with a water block result of "Poor" either failed to buckle, or, they buckled but failed to detach and relax to fully swelling state.

Inventors have surprisingly discovered that with the ideal behavior of buckling and detaching by controlling the nature of the SAP coating composition, the SAP layer's thickness, and the processing conditions, sufficient longitudinal water-blocking performance can be achieved even in systems in which the SAP coatings themselves after swelling are not configured to fill the entire free volume in the buffer tube. This phenomenon is observed with respect to at least Example 11 from Table 2. In such example, a bundle of 5 coated optical fibers having an outside diameter of 240 µm were placed into a tube with a 1 mm inner diameter. Of the 5 fibers, only three were coated with an SAP coating layer, with each SAP layer applied at a thickness of 3.5 µm. The calculated free volume of the tube in this configuration was 0.55 mm². This configuration was able to achieve a longitudinal water blocking performance having a "Good" designation, despite the fact that the actual swell ratio (≈40×, which was based upon calculating the cube of the film swelling ratio of 3.4× as depicted in Table 2, whereupon the on-fiber swelling was estimated to be a three-dimensional volumetric expansion) was less than the theoretical required swell ratio of 69 times, which would have been the value required for each of the 3 SAP-coated fibers to fill the entire free volume. This seemingly paradoxical result is believed to be due to the present inventive coatings' ability to detach and re-orient inside the buffer tube upon water immersion. Thus, rather than filling the entire three-dimensional void, such coatings swell and re-orient sufficiently to block at least one cross section of the buffer tube, thereby trapping water in pockets and preventing it from traversing further across the length of the cable.

It is noted that Example 9 did not perform well in the water block test, but it is surmised that a reconfiguration of the composition used in accordance with some of the higher-swelling compositions of Table 3 could still yield passable results.

Additional Exemplary Embodiments

A first aspect of a first additional exemplary embodiment of the invention is a water-swellable, radiation curable coating composition for a fiber comprising:
  an acrylic acid;
  an acrylic acid salt;
  a monofunctional ethylenically unsaturated network former;
  a photoinitiator;
  a viscosity modifier;
  an amount of water; and
  a multifunctional crosslinker;
  wherein the water-swellable, radiation curable coating composition for a fiber is a liquid at room temperature; and/or
  wherein, when the radiation curable coating composition is coated upon 5 coated optical fibers and is subjected to a longitudinal water blocking tube test as described herein, achieves a distance of a water ingression after 1 hour of exposure to deionized water of less than or equal to 60 centimeters (cm), or less than 30 cm, or less than 10 cm, or from 10 cm to 30 cm, or from 30 cm to 60 cm.

An additional aspect of the first additional exemplary embodiment is the water-swellable, radiation curable coating composition for a fiber of the previous aspect, wherein the acrylic acid is present in an amount, relative to the weight of the entire water-swellable, radiation curable coating composition for a fiber, of about 10 wt. % to about 50 wt. %, or about 10 wt. % to about 50 wt. %, or about 10 wt. % to about 30 wt. %, or about 10 wt. % to about 25 wt. %, or about 15 wt. % to about 40 wt. %, or about 18 wt. % to about 35 wt. %, or about 20 wt. % to about 30 wt. %.

An additional aspect of the first additional exemplary embodiment is the water-swellable, radiation curable coating composition for a fiber of any of the previous aspects, wherein the acrylic acid is present, in an amount relative to the entire composition, from about 0.14 to about 4.2 mol/kg, or from 0.7 to 2.1 mol/kg.

An additional aspect of the first additional exemplary embodiment is the water-swellable, radiation curable coating composition for a fiber of any of the previous aspects, wherein the acrylic acid salt is the reaction product of the acrylic acid and a basic salt.

An additional aspect of the first additional exemplary embodiment is the water-swellable, radiation curable coating composition for a fiber of any of the previous aspects, wherein the reaction of the acrylic acid and the basic salt neutralizes at least 10%-99% of the acrylic acid, or from at least 25% to about 95% of the acrylic acid, or from at least 33% to about 90% of the acrylic acid, or from at least 50% to about 90% of the acrylic acid, or at least 75% of the acrylic acid, or at least 90% of the acrylic acid.

An additional aspect of the first additional exemplary embodiment is the water-swellable, radiation curable coating composition for a fiber of any of the previous aspects, wherein the composition comprises a ratio of the acrylic acid to the acrylic acid salt from about 12:1 to about 1:12, or from about 6:1 to about 1:6, or from about 3:1 to about 1:1.

An additional aspect of the first additional exemplary embodiment is the water-swellable, radiation curable coating composition for a fiber of any of the previous aspects, wherein the basic salt is an alkali salt that further comprises a lithium, sodium, or potassium cation.

An additional aspect of the first additional exemplary embodiment is the water-swellable, radiation curable coating composition for a fiber of any of the previous aspects, wherein the acrylic acid salt comprises sodium acrylate.

An additional aspect of the first additional exemplary embodiment is the water-swellable, radiation curable coating composition for a fiber of any of the previous aspects, wherein the acrylic acid salt is present in an amount by weight, relative to the weight of the entire water-swellable, radiation curable coating composition for a fiber of about 1 wt. % to about 30 wt. %, more preferably from about 5 wt. % to about 15 wt. %.

An additional aspect of the first additional exemplary embodiment is the water-swellable, radiation curable coating composition for a fiber of any of the previous aspects, wherein the acrylic acid and/or acrylic acid salt is present in an amount, relative to the entire composition, from about 1.4 to about 8.3 mol/kg, or from 2.1 to 5.6 mol/kg, or from 2.5 to 4.9 mol/kg, or from, 2.8 to 4.2 mol/kg.

An additional aspect of the first additional exemplary embodiment is the water-swellable, radiation curable coating composition for a fiber of any of the previous aspects, wherein the molar ratio of the acrylic acid to the acrylic acid salt is less than or equal to 9:1, or less than or equal to 3:1, or less than or equal to 1:1, or less than or equal to 1:3, or less than or equal to 1:10, or from 9:1 to 1:10, or from 3:1 to 1:3.

An additional aspect of the first additional exemplary embodiment is the water-swellable, radiation curable coating composition for a fiber of any of the previous aspects, wherein the monofunctional ethylenically unsaturated network former comprises an acrylate ester.

An additional aspect of the first additional exemplary embodiment is the water-swellable, radiation curable coating composition for a fiber of any of the previous aspects, wherein the ethylenically unsaturated network former comprises an acrylamide.

An additional aspect of the first additional exemplary embodiment is the water-swellable, radiation curable coating composition for a fiber of any of the previous aspects, wherein the monofunctional ethylenically unsaturated network former comprises a hydroxy functional acrylate compound.

An additional aspect of the first additional exemplary embodiment is the water-swellable, radiation curable coating composition for a fiber of any of the previous aspects, wherein the hydroxy functional acrylate compound comprises diethylene glycol ethyl ether acrylate, 2-hydroxypropyl acrylate, 3-hydroxy propyl acrylate, hydroxy ethyl acrylate, 4 hydroxy butyl acrylate, 2,3-dihydroxy propyl acrylate, or 2-hydroxy-1-(hydroxymethyl)ethyl acrylate.

An additional aspect of the first additional exemplary embodiment is the water-swellable, radiation curable coating composition for a fiber of any of the previous aspects, wherein the monofunctional ethylenically unsaturated network former comprises an ethoxylated acrylate ether.

An additional aspect of the first additional exemplary embodiment is the water-swellable, radiation curable coating composition for a fiber of any of the previous aspects, wherein the ethoxylated acrylate ether comprises methoxy (polyethylene glycol) acrylate, ethoxy(polyethylene glycol) acrylate, ethylene glycol methyl ether acrylate, diethylene glycol methyl ether acrylate, triethylene glycol methyl ether acrylate, tetratethylene glycol methyl ether acrylate, ethylene glycol ethyl ether acrylate, diethylene glycol ethyl ether acrylate, triethylene glycol ethyl ether acrylate, tetratethylene glycol ethyl ether acrylate, or diethylene glycol-2-ethylhexylether acrylate.

An additional aspect of the first additional exemplary embodiment is the water-swellable, radiation curable coating composition for a fiber of any of the previous aspects, wherein the monofunctional ethylenically unsaturated network former is present in an amount by weight, relative to the weight of the entire water-swellable, radiation curable coating composition for a fiber of about 5 wt. % to about 50 wt. %, more preferably from about 10 wt. % to about 30 wt. %.

An additional aspect of the first additional exemplary embodiment is the water-swellable, radiation curable coating composition for a fiber of any of the previous aspects, wherein the monofunctional ethylenically unsaturated network former is present in an amount, relative to the entire composition, from about 0.38 to about 3.8 mol/kg, or from about 0.75 to about 2.3 mol/kg.

An additional aspect of the first additional exemplary embodiment is the water-swellable, radiation curable coating composition for a fiber of any of the previous aspects, wherein the photoinitiator comprises a phosphine oxide compound.

An additional aspect of the first additional exemplary embodiment is the water-swellable, radiation curable coating composition for a fiber of any of the previous aspects, wherein the photoinitiator is present in an amount by weight, relative to the weight of the entire water-swellable, radiation curable coating composition for a fiber of about 0.1 wt. % to about 5 wt. %, more preferably from about 0.2 wt. % to about 2 wt. %, or from about 0.5 wt. % to about 1.5 wt. %.

An additional aspect of the first additional exemplary embodiment is the water-swellable, radiation curable coating composition for a fiber of any of the previous aspects, wherein the viscosity modifier is water soluble.

An additional aspect of the first additional exemplary embodiment is the water-swellable, radiation curable coating composition for a fiber of any of the previous aspects, wherein the viscosity modifier comprises a polyvinyl alcohol, a polyvinyl pyrrolidone, a starch, a modified cellulose, a gelatin, a polyglycol compound, or a polyacrylic acid.

An additional aspect of the first additional exemplary embodiment is the water-swellable, radiation curable coating composition for a fiber of any of the previous aspects, wherein the modified cellulose comprises a methyl cellulose or hydroxyethyl cellulose compound.

An additional aspect of the first additional exemplary embodiment is the water-swellable, radiation curable coating composition for a fiber of any of the previous aspects, wherein the viscosity modifier comprises a polyvinyl pyrrolidone, wherein said polyvinyl pyrrolidone compound possess a number average molecular weight of 100 kDa to 500 kDa, or from 120 kDa to 200 kDa.

An additional aspect of the first additional exemplary embodiment is the water-swellable, radiation curable coating composition for a fiber of any of the previous aspects, wherein the viscosity modifier is present in an amount by weight, relative to the weight of the entire water-swellable, radiation curable coating composition for a fiber of about 5 wt. % to about 40 wt. %, or about 8 wt. % to about 30 wt. %, or from about 10 wt. % to about 25 wt. %, or from about 15 wt. % to about 20 wt. %.

An additional aspect of the first additional exemplary embodiment is the water-swellable, radiation curable coating composition for a fiber of any of the previous aspects, wherein water is present, in an amount by weight, relative to the weight of the entire water-swellable, radiation curable coating composition for a fiber of about 3 wt. % to about 50 wt. %, or from about 5 wt. % to about 45 wt. %, or from about 10 wt. % to about 40 wt. %, or from about 15 wt. % to about 35 wt. %.

An additional aspect of the first additional exemplary embodiment is the water-swellable, radiation curable coating composition for a fiber of any of the previous aspects, wherein the multifunctional crosslinker comprises a free-radically polymerizable compound with an average of greater than 1.9 functional groups.

An additional aspect of the first additional exemplary embodiment is the water-swellable, radiation curable coating composition for a fiber of any of the previous aspects, wherein the multifunctional crosslinker comprises a multifunctional acrylate or a multifunctional acrylamide.

An additional aspect of the first additional exemplary embodiment is the water-swellable, radiation curable coating composition for a fiber of any of the previous aspects, wherein the multifunctional crosslinker comprises a difunctional acrylate or trifunctional acrylate compound.

An additional aspect of the first additional exemplary embodiment is the water-swellable, radiation curable coating composition for a fiber of any of the previous aspects, wherein the multifunctional crosslinker comprises ethylene glycol diacrylate, diethylene glycol diacrylate, triethylene glycol diacrylate, tetra ethylene glycol diacrylate, ethoxylated hexane diol di acrylate, trimethylolpropane ethoxylate, methyl ether diacrylate, neopentyl glycol diacrylate, 1,3-butanediol diacrylate, glycerol-1,3-diglycerolate diacrylate, 1,6-hexanediyl bis[oxy-2-hydroxy-3,1-propanediyl] bis acrylate, pentaerythritol triacrylate, ethoxylated pentaerythritol triacrylate, 1,4, butanediol diacrylate or 1,6 hexane diol diacrylate.

An additional aspect of the first additional exemplary embodiment is the water-swellable, radiation curable coating composition for a fiber of any of the previous aspects, wherein the multifunctional crosslinker possesses a number average molecular weight from 200 to 20,000 g/mol, or preferably from 200 to 15,000 g/mol, or even more preferably from 400 to 10000 g/mol.

An additional aspect of the first additional exemplary embodiment is the water-swellable, radiation curable coating composition for a fiber of any of the previous aspects, wherein the multifunctional crosslinker comprises an n,n-methylene bisacrylamide compound or an n-n-ethylene bisacrylamide compound.

An additional aspect of the first additional exemplary embodiment is the water-swellable, radiation curable coating composition for a fiber of any of the previous aspects, wherein the multifunctional crosslinker is present, in an amount by weight, relative to the weight of the entire water-swellable, radiation curable coating composition for a fiber from greater than 0.1 wt. % to less than 20 wt. %, or from 0.1 wt. % to 15 wt. %, or from 0.1 wt. % to 10 wt. %, or from 0.1 wt. % to 5 wt. %, more preferably from about 0.5 wt. % to about 3 wt. %.

An additional aspect of the first additional exemplary embodiment is the water-swellable, radiation curable coating composition for a fiber of any of the previous aspects, wherein the multifunctional crosslinker is present in an amount, relative to the entire composition, from about 3.8 to about 190 mmol/kg, or from about 19 to 110 mmol/kg.

An additional aspect of the first additional exemplary embodiment is the water-swellable, radiation curable coating composition for a fiber of any of the previous aspects, wherein the molar ratio of the acrylic acid and the acrylic acid salt to the monofunctional ethylenically unsaturated monomer is from about 1:1 to about 9:1, or from about 1.05:1 to about 6:1, or from about 3:2 to about 4:1.

An additional aspect of the first additional exemplary embodiment is the water-swellable, radiation curable coating composition for a fiber of any of the previous aspects, wherein the molar ratio of the acrylic acid and the acrylic acid salt to the multifunctional crosslinker is from about 24:1 to about 100,000:1, or from about 32:1 to about 1000:1, or from about 50:1 to about 200:1.

An additional aspect of the first additional exemplary embodiment is the water-swellable, radiation curable coating composition for a fiber of any of the previous aspects, wherein the molar ratio of the monofunctional ethylenically unsaturated network former to the multifunctional crosslinker is from about 4:1 to about 1000:1, or from about 9:1 to about 200:1, or from about 20:1 to about 100:1.

An additional aspect of the first additional exemplary embodiment is the water-swellable, radiation curable coating composition for a fiber of any of the previous aspects, wherein the composition further comprises an ink.

An additional aspect of the first additional exemplary embodiment is the water-swellable, radiation curable coating composition for a fiber of the previous aspect, wherein the ink comprises a dye or pigment.

An additional aspect of the first additional exemplary embodiment is the water-swellable, radiation curable coating composition for a fiber of either of the two previous aspects, wherein the ink is present in an amount, relative to the weight of the entire water-swellable, radiation curable coating composition for a fiber of about 0.01 wt. % to about 5 wt. %, or from about 0.05 wt. % to about 2 wt. %, or from about 0.1 wt. % to about 1 wt. %.

An additional aspect of the first additional exemplary embodiment is the water-swellable, radiation curable coating composition for a fiber of any of the previous aspects, wherein the composition is substantially free from a component derived from, or possessing acyl groups derived from, a methacrylic acid.

An additional aspect of the first additional exemplary embodiment is the water-swellable, radiation curable coating composition for a fiber of any of the previous aspects, wherein the composition possesses less than 3%, or less than 2%, or less than 1%, or less than 0.5%, or less than 0.1% of a component derived from a methacrylic acid.

An additional aspect of the first additional exemplary embodiment is the water-swellable, radiation curable coating composition for a fiber of any of the previous aspects, wherein the component derived from a methacrylic acid includes a methacrylate, a methacrylate ester, or a methacrylamide.

An additional aspect of the first additional exemplary embodiment is the water-swellable, radiation curable coating composition for a fiber of any of the previous aspects, wherein the composition possesses a plurality of free-radically polymerizable monomers, wherein the free-radically polymerizable monomers consist essentially of components derived from acrylic acid.

An additional aspect of the first additional exemplary embodiment is the water-swellable, radiation curable coating composition for a fiber of any of the previous aspects, wherein the composition further comprises an additive.

An additional aspect of the first additional exemplary embodiment is the water-swellable, radiation curable coating composition for a fiber of any of the previous aspects, wherein the water-swellable radiation curable coating composition for a fiber possesses a viscosity of from 700 to 2500 cPs at 25° C.

An additional aspect of the first additional exemplary embodiment is the water-swellable, radiation curable coating composition for a fiber of any of the previous aspects, wherein the water-swellable, radiation curable coating possesses, when coated as a 10 mil drawdown film on a glass plate, a swell ratio of at least 5×, or at least 10×, or at least 20×, or at least 30×, or at least 40×, and less than 300×, or less than 200×, or less than 100×.

An additional aspect of the first additional exemplary embodiment is the water-swellable, radiation curable coating composition for a fiber of any of the previous aspects, wherein when the coating is applied at a thickness of about 3 microns to a 4-meter section of an optical fiber possessing a diameter of about 245 microns, and inserted into a horizontally-disposed tube possessing an inner diameter of about 1 mm and exposed at a first end to deionized water that is gravity-fed by a 0.5 m vertical water column for 10 seconds, a travel of said deionized water does not extend beyond 3 meters along the length of the water-impermeable tube from the first end.

An additional aspect of the first additional exemplary embodiment is the water-swellable, radiation curable coating composition for a fiber of any of the previous aspects, wherein the composition is substantially free from a methacrylate compound.

An additional aspect of the first additional exemplary embodiment is the water-swellable, radiation curable coating composition for a fiber of any of the previous aspects, wherein the composition is substantially free from a compound which possesses acyl groups derived from methacrylic acid.

An additional aspect of the first additional exemplary embodiment is the water-swellable, radiation curable coating composition for a fiber of any of the previous aspects, wherein the composition possesses, relative to the weight of the entire composition, less than 3 wt. %, or less than 2 wt. %, or less than 1 wt. %, or less than 0.5 wt. % of a methacrylate compound.

An additional aspect of the first additional exemplary embodiment is the water-swellable, radiation curable coating composition for a fiber of any of the previous aspects, wherein the composition possesses, relative to the weight of the entire composition, less than 3 wt. %, or less than 2 wt. %, or less than 1 wt. %, or less than 0.5 wt. % of a compound which possesses acyl groups derived from methacrylic acid.

An additional aspect of the first additional exemplary embodiment is the water-swellable, radiation curable coating composition for a fiber of any of the previous aspects, wherein the composition comprises one or more compounds possessing free-radically polymerizable functional groups, wherein the free-radically polymerizable groups consist essentially of acrylate functional groups.

A first aspect of a second additional exemplary embodiment of the invention is a coated optical fiber comprising:
  a primary coating;
  a secondary coating adhered to and surrounding said primary coating; and
  a water-swellable exterior coating adhered to and surrounding said secondary coating;
  wherein the water-swellable exterior coating is configured to buckle and detach from the secondary coating at least one point along a section of the coated optical fiber within 3 minutes after the coated optical fiber has been submerged in deionized water within 10 seconds, or within 2 minutes.

An additional aspect of the second additional exemplary embodiment is the coated optical fiber of the previous aspect, wherein the water-swellable exterior coating possesses a thickness of from 0.1 to less than 20 microns, or from 0.2 to 10 microns, or from 0.3 to 5 microns, or from 1 to 4 microns, or from 2 to 20 microns, or from 2 to 15 microns, or from 2 to 10 microns, or from 2 to 8 microns, or from 2 to 5 microns.

An additional aspect of the second additional exemplary embodiment is the coated optical fiber of any of the previous aspects, wherein when a 4 meter section of the coated optical fiber is inserted into a horizontally-disposed water-impermeable tube possessing an inner diameter of about 1 mm and exposed at a first end to deionized water that is gravity-fed by a 0.5 m vertical water column for 10 seconds, a travel of said deionized water does not extend beyond 3 meters along the length of the water-impermeable tube from the first end.

An additional aspect of the second additional exemplary embodiment is the coated optical fiber of any of the previous aspects, wherein when a continuous section of five coated optical fibers are inserted into a horizontally-disposed water-impermeable tube possessing an inner diameter of about 1 mm and a and exposed at a first end to deionized water that is gravity-fed by a 0.5 m vertical water column for 10 seconds, a travel of said deionized water does not extend beyond 3 meters along the length of the water-impermeable tube from the first end.

An additional aspect of the second additional exemplary embodiment is the coated optical fiber of any of the previous aspects, wherein the water-swellable exterior coating is the cured product of the water-swellable radiation curable coating of any of the aspects of the first additional exemplary embodiment.

An additional aspect of the second additional exemplary embodiment is the coated optical fiber of any of the previous aspects, wherein the water-swellable exterior coating is further configured to possess a three-dimensional swelling ratio of from about 3× to about 300×, or from about 5× to about 250×, or from about 30× to about 200×.

An additional aspect of the second additional exemplary embodiment is the coated optical fiber of any of the previous aspects, wherein the water-swellable exterior coating possesses a top surface percent reacted acrylate unsaturation (% RAU) of at least 80%, more preferably at least 90%, or at least 95%, or at least 98%, or at least 99% when tested according to an FTIR method.

A first aspect of a third additional exemplary embodiment of the invention is a method of applying a liquid water-swellable coating to a coated optical fiber comprising the steps of:
providing a coated optical fiber;
applying a liquid water-swellable coating composition to an exterior surface of a section of coated optical fiber to form a coated optical fiber with a liquid water-swellable exterior coating composition;
and exposing the coated optical fiber with the liquid water-swellable exterior coating composition to a light source capable of emitting ultraviolet radiation to affect curing of said liquid water-swellable exterior coating composition, to form a coated optical fiber with a water-swellable exterior coating;
wherein the water-swellable exterior coating is configured to buckle and detach from the coated optical fiber at least one point along the section of the coated optical fiber within 3 minutes after the time from which the coated optical fiber with the water-swellable exterior coating has been submerged in deionized water.

An additional aspect of the third additional exemplary embodiment is the method according to the preceding aspect, wherein the wherein the liquid water-swellable coating composition is defined by the composition of any of aspects of the first additional exemplary embodiment.

An additional aspect of the third additional exemplary embodiment is the method according to any of the preceding aspects, wherein the providing step comprises unwinding the section of coated optical fiber from a first spool.

An additional aspect of the third additional exemplary embodiment is the method according to any of the preceding aspects, wherein the providing step comprises feeding the section of the coated optical fiber into an inking machine.

An additional aspect of the third additional exemplary embodiment is the method according to any of the preceding aspects, wherein the liquid water-swellable coating composition is applied to the exterior surface of the section of the coated optical fiber at a thickness of from 0.1 to 20 microns, or from about 0.2 to about 10 microns, or from about 0.3 to about 5 microns, or from about 1 to about 4 microns.

An additional aspect of the third additional exemplary embodiment is the method according to any of the preceding aspects, wherein the liquid water-swellable coating composition possesses a viscosity of from 700 to 2500 cPs at 25° C.

An additional aspect of the third additional exemplary embodiment is the method according to any of the preceding aspects, further comprising the step of re-winding at least a portion of the coated optical fiber with the cured water-swellable exterior coating onto a second spool to form a section of partially rewound coated optical fiber.

An additional aspect of the third additional exemplary embodiment is the method according to any of the preceding aspects, further comprising the step of feeding the coated optical fiber with the water-swellable exterior coating directly into a buffer tube in a buffer tube extrusion process.

An additional aspect of the third additional exemplary embodiment is the method according to any of the preceding aspects, wherein the water-swellable exterior coating possesses a top surface percent reacted acrylate unsaturation (% RAU) of at least 80%, more preferably at least 90%, or at least 95%, or at least 98%, or at least 99% when tested according to an FTIR method.

An additional aspect of the third additional exemplary embodiment is the method according to any of the preceding aspects, wherein the winding of the coated optical fiber occurs at a speed of from 20 m/min to about 1000 m/min, or from about 50 m/min to about 500 m/min.

An additional aspect of the third additional exemplary embodiment is the method according to any of the preceding aspects, wherein the light source is configured to impart an irradiance, at a surface of the liquid water-swellable exterior coating, or at least about 1 W/cm$^2$; more preferably from about 1 W/cm$^2$ to about 9 W/cm$^2$, or from about 2 W/cm$^2$ to about 6 W/cm$^2$, or from about 3 W/cm$^2$ to about 5 W/cm$^2$.

An additional aspect of the third additional exemplary embodiment is the method according to any of the preceding aspects, wherein the water-swellable exterior coating is further configured to possess a three-dimensional swelling ratio of from about 3× to about 300×, or from about 5× to about 250×, or from about 30× to about 200×.

A first aspect of a fourth additional exemplary embodiment of the invention is a buffered bundle of optical fibers, comprising
a flexible buffer tube possessing a length and a cavity over at least a portion of the length; and
a plurality of coated optical fibers disposed within the cavity of the flexible buffer tube along the portion;
wherein at least one of the plurality of coated optical fibers comprises a water-swellable exterior coating;
wherein said water-swellable exterior coating is configured to buckle and detach from the coated optical fiber at least one point along a section thereof within 3 minutes from a time at which the cavity becomes filled with deionized water.

An additional aspect of the fourth additional exemplary embodiment is the buffered bundle of optical fibers of the preceding aspect, wherein the water-swellable exterior coating is the cured product of a composition as defined by any of the aspects of the first additional exemplary embodiment of the invention.

An additional aspect of the fourth additional exemplary embodiment is the buffered bundle of optical fibers of any of the preceding aspects, wherein at least two coated optical fibers comprise a water-swellable exterior coating.

An additional aspect of the fourth additional exemplary embodiment is the buffered bundle of optical fibers of any of the preceding aspects, wherein at least one of said water-swellable exterior coatings possesses a three-dimensional swelling ratio of from about 3× to about 300×, or from about 5× to about 250×, or from about 30× to about 200×.

An additional aspect of the fourth additional exemplary embodiment is the buffered bundle of optical fibers of any of the preceding aspects, wherein at least one of said water-swellable exterior coatings possesses a thickness of from 0.1 to less than 20 microns, or from about 0.2 to about 10 microns, or from about 0.3 to about 5 microns, or from about 1 to about 4 microns.

An additional aspect of the fourth additional exemplary embodiment is the buffered bundle of optical fibers of any of the preceding aspects, wherein at least one of said water-swellable exterior coating possesses a top surface percent reacted acrylate unsaturation (% RAU) of at least 80%, more preferably at least 90%, or at least 95%, or at least 98%, or at least 99% when tested according to an FTIR method.

An additional aspect of the fourth additional exemplary embodiment is the buffered bundle of optical fibers of any of the preceding aspects, further comprising a free volume which is defined by a volume of the cavity over a portion of the length minus the volume of the plurality of coated optical fibers disposed therein along said portion, and a total amount of water-swellable exterior coating, wherein the total amount of water-swellable exterior coating is configured to swell to less than 100% of the free volume, or between 50%-90% of the free volume, or between 60%-90% of the free volume, or between 70%-90% of the free volume, or between 50%-80% of the free volume, or between 50%-70% of the free volume.

An additional aspect of the fourth additional exemplary embodiment is the buffered bundle of optical fibers of any of the preceding aspects, wherein at least 25% of the coated optical fibers possess a water-swellable exterior coating.

An additional aspect of the fourth additional exemplary embodiment is the buffered bundle of optical fibers of any of the preceding aspects, wherein from 25% to 90%, or 25% to 75%, or 25% to 50% of the coated optical fibers comprise a water-swellable exterior coating.

An additional aspect of the fourth additional exemplary embodiment is the buffered bundle of optical fibers of any of the preceding aspects, wherein the buffered bundle, when placed horizontally and exposed at a first end to deionized water that is gravity-fed by a 0.5 m vertical water column for 5 minutes, prevents the travel of said deionized water beyond 3 meters along the length of the buffered bundle from the first end.

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A coated optical fiber comprising:
    a primary coating;
    a secondary coating adhered to and surrounding said primary coating; and
    a water-swellable exterior coating adhered to and surrounding said secondary coating;
    wherein the water-swellable exterior coating is configured to buckle and detach from the secondary coating at least at one point along a section of the coated optical fiber after the coated optical fiber has been submerged in deionized water; and
    wherein the water-swellable exterior coating is configured such that, when it is applied to at least 2 out of 5 optical fibers having an outer diameter of 240 microns, and said 5 optical fibers are inserted into a horizontally-disposed water-impermeable tube possessing an inner diameter of 1 mm and a length of 75 cm, and said inserted fibers are exposed at a first end to deionized water that is gravity-fed by a 0.5 m vertical water column for 1 hour in accordance with a longitudinal water blocking tube test as described herein, a travel of said deionized water does not extend beyond 60 centimeters (cm) along the length of the water-impermeable tube as measured from the first end.

2. The coated optical fiber of claim 1, wherein the water-swellable exterior coating possesses a thickness from 1 to 20 microns.

3. The coated optical fiber of claim 2, wherein the water-swellable exterior coating is configured to buckle and detach from the secondary coating at least one point along a section of the coated optical fiber within 3 minutes after the coated optical fiber has been submerged in deionized water.

4. The coated optical fiber of claim 2, wherein the water-swellable exterior coating is further configured to possess a three-dimensional swelling ratio of from about 3 times (×) to about 300×.

5. The coated optical fiber of any of the preceding claims claim 2, wherein the water-swellable exterior coating is the cured product of a water-swellable radiation curable coating composition comprising:
    an acrylic acid;
    optionally, a quantity of a basic salt that has not been neutralized;
    an acrylic acid salt;
    a monofunctional ethylenically unsaturated network former;
    a photoinitiator;
    a viscosity modifier;
    water; and
    a multifunctional crosslinker.

6. The coated optical fiber of claim 5, wherein the water-swellable radiation curable coating composition comprises, relative to the weight of the entire composition:
    from 0 wt. % to 50 wt. % of the acrylic acid;
    from 1 wt. % to 30 wt. % of the acrylic acid salt;
    from 5 wt. % to 50 wt. % of the monofunctional ethylenically unsaturated network former;
    from 0.1 wt. % to 5 wt. % of a photoinitiator;
    from 5 wt. % to 40 wt. % of a viscosity modifier; and
    from 0.1 wt. % to 20 wt. % of the multifunctional crosslinker;

wherein the water-swellable, radiation curable coating composition for a fiber is a liquid at room temperature.

7. The coated optical fiber of claim 5, wherein the wherein the basic salt is an alkali salt that further comprises a lithium, sodium, or potassium cation, and the acrylic acid salt is the reaction product of the acrylic acid and the basic salt.

8. The coated optical fiber of claim 5, wherein the monofunctional ethylenically unsaturated network former comprises methoxy (polyethylene glycol) acrylate, ethoxy (polyethylene glycol) acrylate, ethylene glycol methyl ether acrylate, diethylene glycol methyl ether acrylate, triethylene glycol methyl ether acrylate, tetratethylene glycol methyl ether acrylate, ethylene glycol ethyl ether acrylate, diethylene glycol ethyl ether acrylate, triethylene glycol ethyl ether acrylate, tetratethylene glycol ethyl ether acrylate, or diethylene glycol-2-ethylhexylether acrylate.

9. The coated optical fiber of claim 5, wherein the viscosity modifier comprises a polyvinyl alcohol, a polyvinyl pyrrolidone, a starch, a modified cellulose, a gelatin, a polyglycol compound, or a polyacrylic acid.

10. The coated optical fiber of claim 5, wherein the multifunctional crosslinker comprises a free-radically polymerizable compound with an average of greater than 1.9 functional groups selected from the group consisting of ethylene glycol diacrylate, diethylene glycol diacrylate, triethylene glycol diacrylate, tetra ethylene glycol diacrylate, ethoxylated hexane diol diacrylate, trimethylolpropane ethoxylate, methyl ether diacrylate, neopentyl glycol diacrylate, 1,3-butanediol diacrylate, glycerol-1,3-diglycerolate diacrylate, 1,6-hexanediyl bis[oxy-2-hydroxy-3,1-propanediyl] bis acrylate, pentaerythritol triacrylate, ethoxylated pentaerythritol triacrylate, 1,4, butanediol diacrylate and 1,6 hexane diol diacrylate, and any combination thereof;
wherein the multifunctional crosslinker possesses a number average molecular weight from 200 to 20,000 g/mol.

11. The coated optical fiber of claim 5, wherein the composition further comprises an ink.

12. The coated optical fiber of claim 11, wherein the composition further comprises one or more additives.

13. The coated optical fiber of claim 2, wherein the water-swellable exterior coating possesses a top surface percent reacted acrylate unsaturation (% RAU) of at least when tested according to an FTIR method.

14. A method of applying a liquid water-swellable coating to a cured coated optical fiber comprising the steps of:
providing a cured coated optical fiber;
applying a liquid water-swellable coating composition to an exterior surface of a section of the cured coated optical fiber to form a cured coated optical fiber with a liquid water-swellable exterior coating composition;
and exposing the cured coated optical fiber with the liquid water-swellable exterior coating composition to a light source capable of emitting ultraviolet radiation to affect curing of said liquid water-swellable exterior coating composition, to form a cured coated optical fiber with a water-swellable exterior coating as defined by claim 1;
wherein the water-swellable exterior coating is configured to buckle and detach from the cured coated optical fiber at least one point along the section of the cured coated optical fiber within after the time from which the cured coated optical fiber with the water-swellable exterior coating has been submerged in deionized water.

15. A buffered bundle of optical fibers, comprising:
a flexible buffer tube possessing a length and a cavity over at least a portion of the length; and
a plurality of coated optical fibers disposed within the cavity of the flexible buffer tube along the portion, wherein at least one of the coated optical fibers is defined by claim 1;
wherein at least one of the plurality of coated optical fibers comprises a water-swellable exterior coating; wherein said water-swellable exterior coating is configured to buckle and detach from the coated optical fiber at least one point along a section thereof within 1 minute from a time at which the cavity becomes filled with deionized water.

16. The coated optical fiber of claim 6, wherein the water-swellable exterior coating is configured such that, when it is applied to at least 4 out of the 5 optical fibers, the travel of said deionized water extends from 10 cm to 30 cm along the length of the water-impermeable tube as measured from the first end.

17. The coated optical fiber of claim 6, wherein the water-swellable exterior coating possesses a thickness from 2 to 5 microns.

18. The coated optical fiber of claim 17, wherein the water-swellable exterior coating is configured to buckle and detach from the secondary coating at least one point along a section of the coated optical fiber within 30 seconds after the coated optical fiber has been submerged in deionized water.

19. The coated optical fiber of claim 18, wherein the three-dimensional swelling ratio is from 30× to 200×.

20. The coated optical fiber of claim 19, wherein the water-swellable radiation curable coating composition comprises, relative to the weight of the entire composition:
from 10 wt. % to 35 wt. % of the acrylic acid;
from 5 wt. % to 15 wt. % of the acrylic acid salt;
from 10 wt. % to 30 wt. % of the monofunctional ethylenically unsaturated network former;
from 10 wt. % to 25 wt. % of a viscosity modifier; and
from 0.1 wt. % to 5 wt. % of the multifunctional crosslinker.

* * * * *

UNITED STATES PATENT AND TRADEMARK OFFICE
CERTIFICATE OF CORRECTION

PATENT NO. : 11,319,246 B2
APPLICATION NO. : 16/760476
DATED : May 3, 2022
INVENTOR(S) : Huimin Cao et al.

Page 1 of 1

It is certified that error appears in the above-identified patent and that said Letters Patent is hereby corrected as shown below:

In the Claims

Column 46, Line 43, Claim 5 delete "any of the preceeding claims".

Column 48, Line 9, Claim 14 insert the text --1 minute-- between the texts "within" and "after the time from which the cured".

Signed and Sealed this
Twenty-first Day of June, 2022

Katherine Kelly Vidal
*Director of the United States Patent and Trademark Office*